US010323804B2

(12) United States Patent
Nakamura

(10) Patent No.: US 10,323,804 B2
(45) Date of Patent: Jun. 18, 2019

(54) LIGHT-EMITTING DEVICE, SURFACE LIGHT SOURCE DEVICE AND DISPLAY DEVICE

(71) Applicant: Enplas Corporation, Saitama (JP)

(72) Inventor: Masato Nakamura, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/740,130

(22) PCT Filed: Jun. 24, 2016

(86) PCT No.: PCT/JP2016/068823
§ 371 (c)(1),
(2) Date: Dec. 27, 2017

(87) PCT Pub. No.: WO2017/002725
PCT Pub. Date: Jan. 5, 2017

(65) Prior Publication Data
US 2018/0187841 A1   Jul. 5, 2018

(30) Foreign Application Priority Data

Jul. 2, 2015 (JP) ................. 2015-133440
Dec. 15, 2015 (JP) ................. 2015-244268

(51) Int. Cl.
*F21S 2/00*  (2016.01)
*G02B 27/01* (2006.01)
(Continued)

(52) U.S. Cl.
CPC ............... *F21S 2/005* (2013.01); *F21V 5/04* (2013.01); *F21V 13/02* (2013.01); *G02B 19/0066* (2013.01); *G02B 27/01* (2013.01)

(58) Field of Classification Search
CPC ...... F21S 2/005; G02B 19/0066; G02B 27/01; F21V 13/02; F21V 5/04
See application file for complete search history.

(56) References Cited

U.S. PATENT DOCUMENTS 5,355,187 A * 10/1994 Ogino ................. G02B 3/0043
                                                    348/E9.027
5,537,171 A    7/1996 Ogino et al.
(Continued)

FOREIGN PATENT DOCUMENTS

JP    05-257114 A    10/1993
JP    2011-044411 A    3/2011
(Continued)

OTHER PUBLICATIONS

International Search Report from International Application No. PCT/JP2016/068823 dated Sep. 27, 2016.

*Primary Examiner* — David V Bruce
(74) *Attorney, Agent, or Firm* — Brundidge & Stanger, P.C.

(57) ABSTRACT

The first light flux control member comprises: a concave first entrance surface, facing the plurality of light-emitting elements; and a first exit surface, and an outer exit surface. The second light flux control member controls and causes the light exiting from the first light flux control member to become oriented in the direction along the first central axis. In addition, when f represents the focal distance of the first light flux control member, and d represents the distance between the first central axis and the optical axis in the light-emitting element farthest from the first central axis, the surface light source device satisfies $-0.6 < d/f < 0$.

5 Claims, 18 Drawing Sheets

(51) Int. Cl.
*F21V 5/04* (2006.01)
*F21V 13/02* (2006.01)
*G02B 19/00* (2006.01)

(56) References Cited

U.S. PATENT DOCUMENTS

| | | |
|---|---|---|
| 5,758,940 A | 6/1998 | Ogino et al. |
| 2011/0044053 A1 | 2/2011 | Yamaguchi |
| 2011/0075434 A1 | 3/2011 | Kurokawa |
| 2015/0167924 A1* | 6/2015 | Uchida .............. G02B 19/0014 362/311.09 |
| 2015/0211709 A1 | 7/2015 | Uchida et al. |

FOREIGN PATENT DOCUMENTS

| | | |
|---|---|---|
| JP | 2011-076832 A | 4/2011 |
| WO | 2014/017652 A1 | 1/2014 |

* cited by examiner

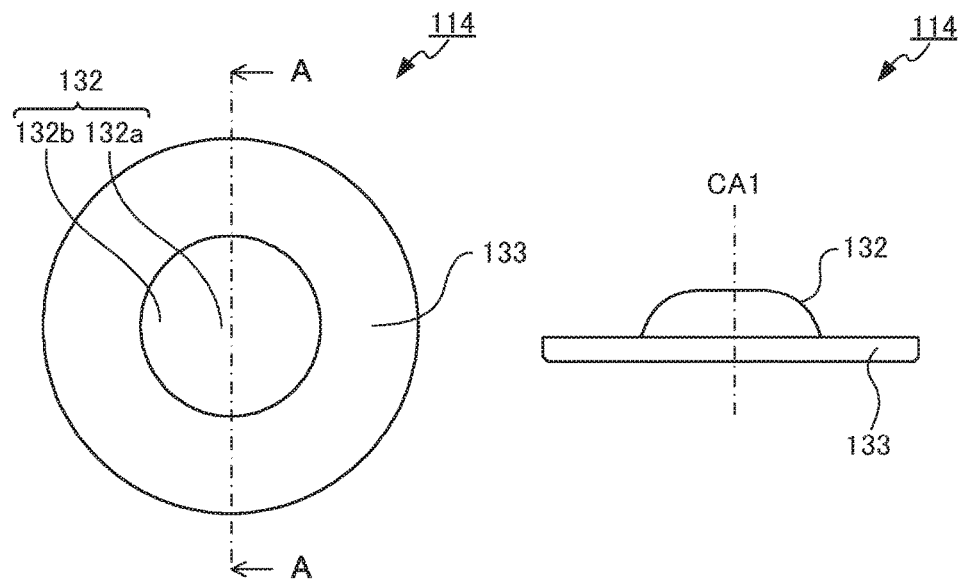
FIG. 3A
FIG. 3C
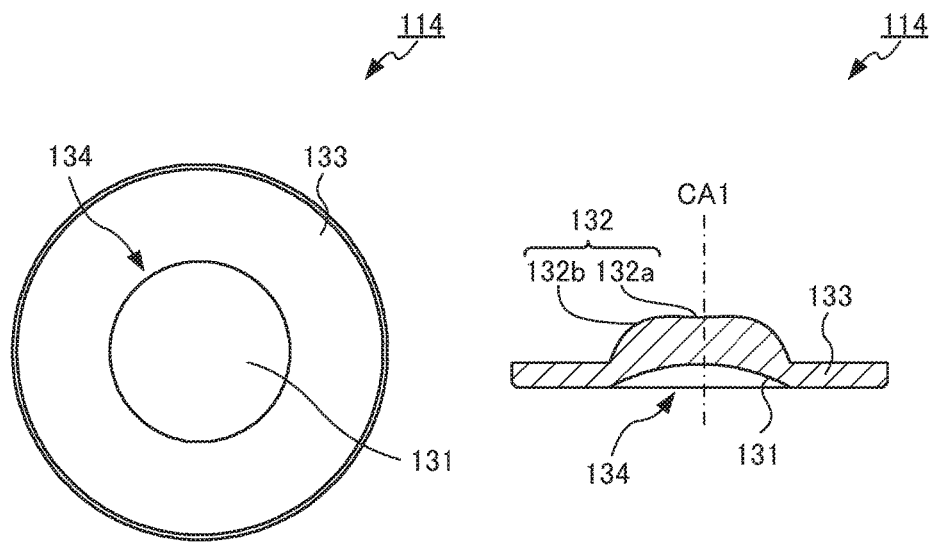
FIG. 3B
FIG. 3D

LIGHT-EMITTING DEVICE, SURFACE LIGHT SOURCE DEVICE AND DISPLAY DEVICE

TECHNICAL FIELD

The present invention relates to a light-emitting device including a plurality of light-emitting elements, and a surface light source device and a display device including the light-emitting device.

BACKGROUND ART

In recent years, head-up displays (HUDs) which can directly display speed information and the like on a screen (for example, a windshield of a car) are used. In an exemplary HUD, the distribution of light emitted from a light-emitting element is controlled by a lens (light flux controlling member), and then the light is projected onto a screen through a liquid crystal panel and the like. Thus a user can recognize the projected information from reflection light from the screen.

In HUDs, a surface light source device using a plurality of light-emitting elements (for example, LEDs) can be employed as the light source. However, the surface light source device using a plurality of light-emitting elements might cause luminance unevenness with a high luminance region and a low luminance region on the emission surface of the surface light source device. In view of this, some methods have been proposed to reduce such luminance unevenness (for example, PTL 1).

FIG. 1A is a sectional view illustrating a configuration of surface light source device 10 disclosed in PTL 1, FIG. 1B is a schematic plan view illustrating lens array 14 provided in surface light source device 10 disclosed in PTL 1, FIG. 1C is a graph showing a luminance distribution (relative luminance) of light emitted from lens array 14 disclosed in PTL 1, and FIG. 1D is a graph showing a luminance distribution (relative luminance) of light emitted from a lens array having no irregularity at the boundary line between adjacent two lenses.

Surface light source device 10 disclosed in PTL 1 includes a plurality of LEDs 12 disposed on substrate 11, lens array 14, and diffusion member 15. As illustrated in FIG. 1A, seven LEDs 12 are disposed in a line on surface light source device 10. In addition, as illustrated in FIG. 1B, seven lenses 13 corresponding to seven LEDs 12 are disposed in a line on lens array 14. Irregular part 17 is formed on boundary line 16 between adjacent two lenses 13 of lens array 14. In surface light source device 10 disclosed in PTL 1, the light emitted from LED 12 is converged at lenses 13, and the converged light is diffused by diffusion member 15. At this time, the luminance of the light emitted from lens array 14 is equalized by irregular part 17. Thus, in comparison with the case where no irregularity is formed (see FIG. 1D), surface light source device 10 disclosed in PTL 1 reduces the difference in luminance between the high luminance region and the low luminance region (see FIG. 1C).

CITATION LIST

Patent Literature

PTL 1
Japanese Patent Application Laid-Open No. 2011-76832

SUMMARY OF INVENTION

Technical Problem

As illustrated in FIG. 1C, however, surface light source device 10 disclosed in PTL 1 cannot sufficiently reduce the luminance unevenness.

In view of this, an object of the present invention is to provide a light-emitting device which causes less luminance unevenness even when a plurality of light-emitting elements are used. In addition, another object of the present invention is to provide a surface light source device and a display device including the light-emitting device.

Solution to Problem

A light-emitting device according to embodiments of the present invention includes: a plurality of light-emitting elements; and a light flux controlling member including a first light flux controlling member and a second light flux controlling member, the light flux controlling member being configured to control a distribution of light emitted from the plurality of light-emitting elements. The first light flux controlling member includes: a first incidence surface having a recessed shape disposed to intersect a first central axis of the first light flux controlling member and to face the plurality of light-emitting elements, and a first emission surface disposed on a side opposite to the first incidence surface, the first emission surface including an inner emission surface disposed to intersect the first central axis, and an outer emission surface disposed to surround the inner emission surface, the outer emission surface having a protruding shape in a cross section including the first central axis. The second light flux controlling member controls light emitted from the first light flux controlling member to travel in a direction along the first central axis, and the following Expression (1) is satisfied $$-0.6 < d/f < 0 \quad (1)$$

where f represents a focus distance of the first light flux controlling member, and d represents a distance between the first central axis and an optical axis of one of the plurality of light-emitting elements which is the most remote light-emitting element from the first central axis among the plurality of light-emitting elements.

A surface light source device according to embodiments of the present invention includes: the above-mentioned light-emitting device; and a diffusion plate disposed with an air layer interposed between the diffusion plate and the light-emitting device.

A display device according to embodiments of the present invention includes: the above-mentioned surface light source device; and a display member configured to be illuminated with light emitted from the surface light source device.

Advantageous Effects of Invention

According to the present invention, it is possible to provide a light-emitting device which causes less luminance unevenness even when a plurality of light-emitting elements are used, and a surface light source device and a display device including the light-emitting device.

BRIEF DESCRIPTION OF DRAWINGS

FIG. 3A to FIG. 3D illustrate a configuration of a first light flux controlling member;

DESCRIPTION OF EMBODIMENTS

Embodiments of the present invention are described in detail below by referring to the accompanying drawings. In the following description, a display device which can be used for displaying screen information in an HUD is described. The HUD includes a display device, a screen, and a projection lens for appropriately projecting light from the display device onto the screen. The light emitted from the display device is applied onto the screen through an optical projection system including a projection lens and the like.
(Embodiment 1)
(Configurations of Surface Light Source Device and Display Device)

Figure 1A:
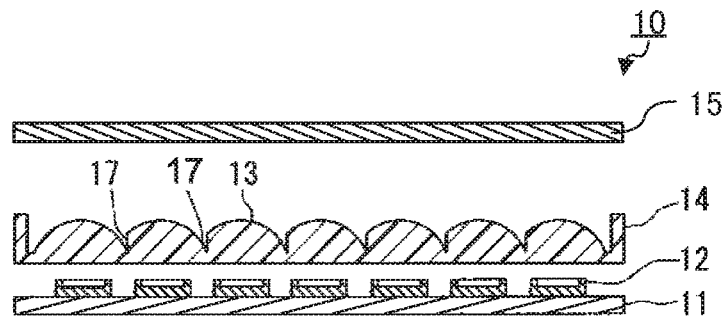
FIG. 1A and FIG. 1B are drawings for describing a configuration of a surface light source device disclosed in PTL 1.
Figure 1B:
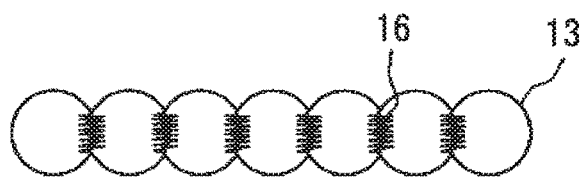
Figure 1C:
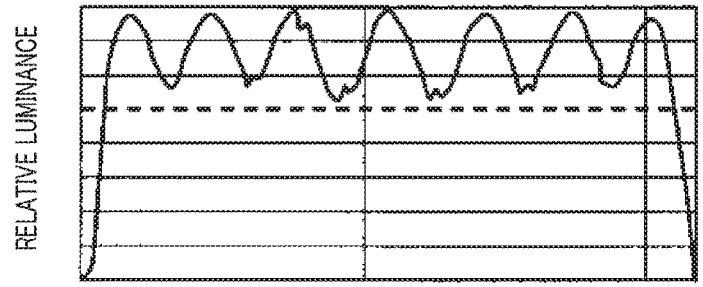
FIG. 1C and FIG. 1D are graphs for describing a luminance distribution of light emitted from a lens array.
Figure 1D:
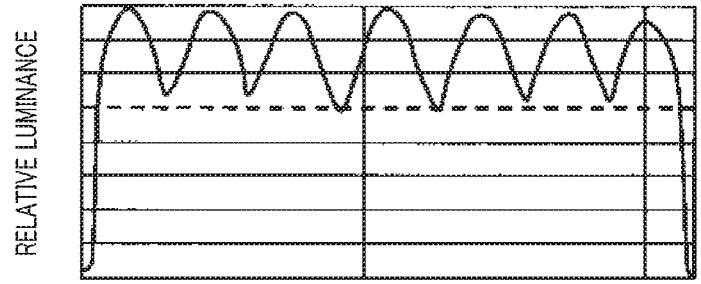
Figure 2A:
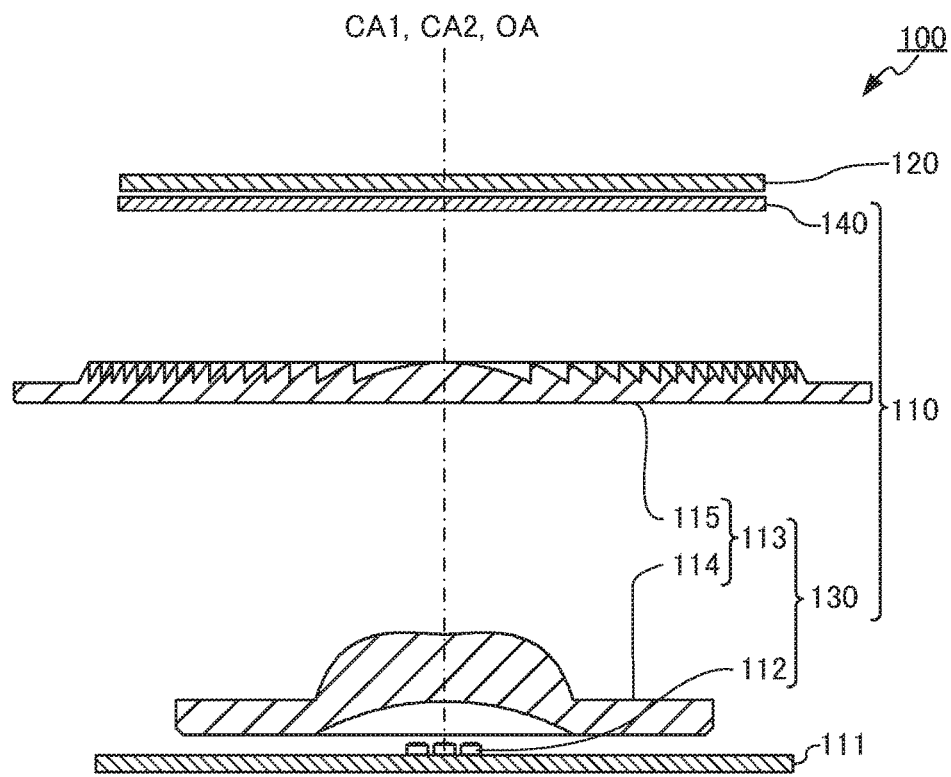
FIG. 2A is a sectional view of a display device according to Embodiment 1 of the present invention.
Figure 2B:
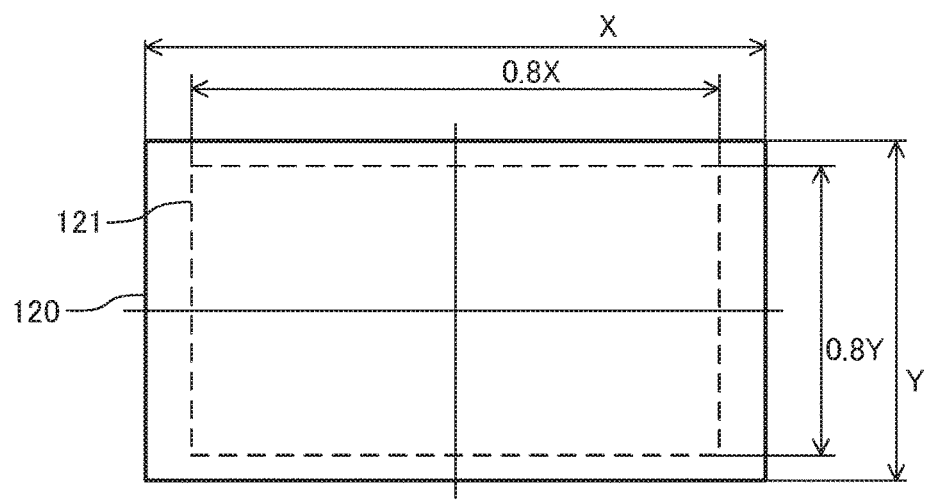
FIG. 2B illustrates a display region of the display device illustrated in FIG. 2A.

FIG. 2A is a sectional view of display device 100 according to Embodiment 1 of the present invention, and FIG. 2B illustrates display region 121 of display device 100 illustrated in FIG. 2A. A first leg part is omitted in FIG. 2A.

As illustrated in FIG. 2A and FIG. 2B, display device 100 according to Embodiment 1 includes surface light source device 110 and display member 120.

Surface light source device 110 is a light source of display device 100. Surface light source device 110 includes light-emitting device 130 and diffusion plate 140. Light-emitting device 130 includes a plurality of light-emitting elements 112, and light flux controlling member 113 including first light flux controlling member 114 and second light flux controlling member 115. Light-emitting device 130 is disposed on substrate 111.

Substrate 111 supports light-emitting elements 112 and light flux controlling member 113. The type of substrate 111 is not limited. In view of supplying electricity to light-emitting element 112, it is preferable to use a circuit board as substrate 111. For example, substrate 111 is a substrate such as a glass composite substrate, a glass epoxy substrate, and an Al substrate.

Light-emitting element 112 is the light source of surface light source device 110, and fixed on substrate 111. For example, light-emitting element 112 is a light-emitting diode (LED). The colors of the light emitted from light-emitting elements 112 may be identical to each other or different from each other. In the present embodiment, the colors of the light emitted from light-emitting elements 112 are identical to each other. In addition, the color of the light emitted from light-emitting element 112 is not limited. The color of the light emitted from light-emitting element 112 can be white, red, blue, green and the like. Normally, the intensity of the light emitted from light-emitting element 112 is highest in the direction of the normal to the light-emitting surface of light-emitting element 112. The number of light-emitting elements 112 may be appropriately changed in accordance with the size of display member 120, the distance between substrate 111 and display member 120, and the like. In the present embodiment, three light-emitting elements 112 are provided. Placement of light-emitting elements 112 is not limited. Light-emitting elements 112 may be disposed on a straight line, or may be disposed at positions corresponding to vertices of a polygon, or, may be disposed on a circle. In the present embodiment, light-emitting elements 112 are disposed on a straight line. In addition, in the present embodiment, light-emitting elements 112 are disposed in such a manner that the optical axis of light-emitting element 112 disposed at the center coincides with first central axis CA1 (second central axis CA2). Here, the "optical axis of light-emitting element 112" is the travelling direction of light at the center of the total light flux which is stereoscopically emitted from light-emitting element 112. In addition, the "optical axis of a plurality of light-emitting elements 112" is the travelling direction of light at the center of the total light flux which is stereoscopically emitted from the plurality of light-emitting elements 112. In addition, the distance between light-emitting elements 112 adjacent to each other (the distance between the optical axes of light-emitting elements 112 adjacent to each other) is not limited.

Light flux controlling member 113 controls the distribution of the light emitted from light-emitting element 112. Light flux controlling member 113 includes first light flux controlling member 114 and second light flux controlling member 115. First central axis CA1 of first light flux controlling member 114 and second central axis CA2 of second light flux controlling member 115 may or may not be coincide with each other. In the present embodiment, first central axis CA1 of first light flux controlling member 114 and second central axis CA2 of second light flux controlling member 115 coincide with each other. First light flux controlling member 114 is disposed on light-emitting element 112 side, and second light flux controlling member 115 is disposed (on diffusion plate 140 side) at a position distanced from light-emitting element 112 in comparison with first light flux controlling member 114. First light flux controlling member 114 (first incidence surface 131 and first emission surface 132) is rotationally symmetrical about first central axis CA1, and second light flux controlling member 115 (second incidence surface 141 and second emission surface 142) is rotationally symmetrical about second central axis CA2. First light flux controlling member 114 and second light flux controlling member 115 are disposed in such a manner that first central axis CA1 and second central axis CA2 coincide with each other.

The materials of first light flux controlling member 114 and second light flux controlling member 115 may be identical to each other or different from each other. The examples of the materials of first light flux controlling member 114 and second light flux controlling member 115 include: translucent resins such as polymethylmethacrylate (PMMA), polycarbonate (PC), and epoxy resin (EP), and translucent glass. In addition, first light flux controlling member 114 and second light flux controlling member 115 may be produced by injection molding, for example. The configurations of first light flux controlling member 114 and second light flux controlling member 115 are described later.

Diffusion plate 140 allows light emitted from surface light source device 110 to pass therethrough while diffusing the light. Examples of diffusion plate 140 include a plate-shaped transparent member provided with a light diffusion treatment (for example, a roughening treatment), and a plate-shaped transparent member added with a scattering member such as beads.

Display member 120 is a liquid crystal panel, for example. Display member 120 includes display region 121 in which to display an image to be projected onto the screen. Display region 121 is uniformly illuminated with light controlled by surface light source device 110. It is to be noted that, in the present embodiment, display region 121 is a region represented by 0.8X×0.8Y, where X represents the long side of display member 120 and Y represents the short side of display member 120 (see FIG. 2B).

The distribution of the light emitted from light-emitting element 112 is controlled by first light flux controlling member 114 and second light flux controlling member 115. The light emitted from second light flux controlling member 115 passes through diffusion plate 140 while being diffused so as to uniformly illuminate display member 120.

(Configuration of Light Flux Controlling Member)

Figure 4A:
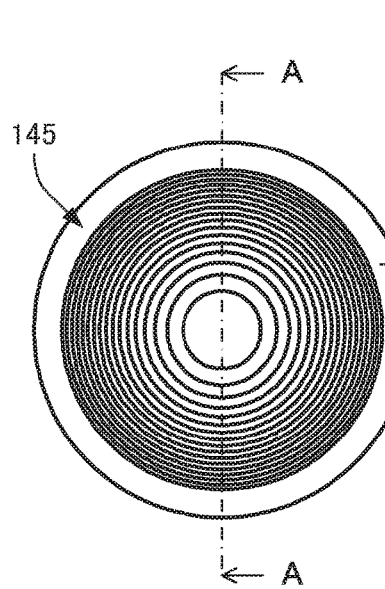
FIG. 4A to FIG. 4D illustrate a configuration of a second light flux controlling member.
Figure 4C:
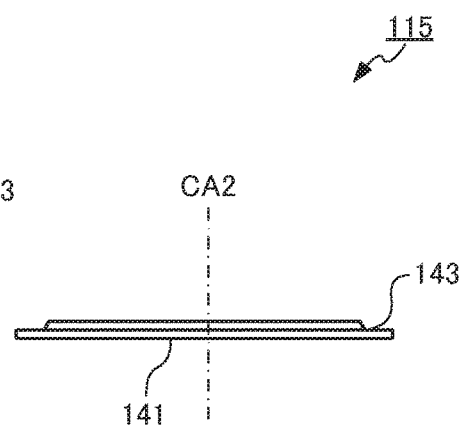
Figure 4B:
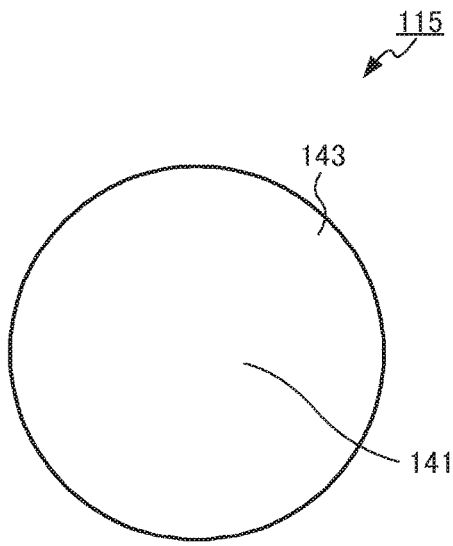
Figure 4D:
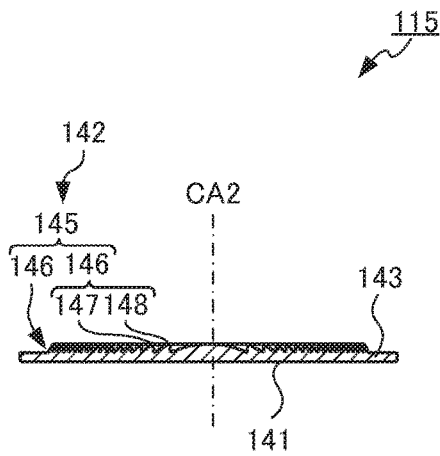

FIG. 3A to FIG. 3D illustrate a configuration of first light flux controlling member 114. FIG. 3A is a plan view of first light flux controlling member 114, FIG. 3B is a bottom view of first light flux controlling member 114, FIG. 3C is a side view of first light flux controlling member 114, and FIG. 3D is a sectional view of first light flux controlling member 114 taken along line A-A of FIG. 3A. FIG. 4A to FIG. 4D illustrate a configuration of second light flux controlling member 115. FIG. 4A is a plan view of second light flux controlling member 115, FIG. 4B is a bottom view of second light flux controlling member 115, FIG. 4C is a side view of second light flux controlling member 115, and FIG. 4D is a sectional view of second light flux controlling member 115 taken along line A-A of FIG. 4A.

As described above, light flux controlling member 113 includes first light flux controlling member 114 and second light flux controlling member 115.

First light flux controlling member 114 controls the distribution of the light emitted from light-emitting element 112. As FIG. 3A to FIG. 3D illustrate, first light flux controlling member 114 includes first incidence surface 131 and first emission surface 132. It is to be noted that first light flux controlling member 114 may be provided with first flange 133. In addition, a first leg part (omitted in the drawing) for fixing first light flux controlling member 114 to substrate 111 may be provided on the rear side of first flange 133. First light flux controlling member 114 is disposed so as to face light-emitting element 112. The way of fixing first light flux controlling member 114 to substrate 111 is not limited, and first light flux controlling member 114 may be fixed by bonding, screw-fixing, fixing with a holder, or the like. For example, first light flux controlling member 114 and substrate 111 are fixed to each other by bonding the first leg part to substrate 111 with an adhesive agent.

First incidence surface 131 allows the light emitted from light-emitting element 112 to enter first light flux controlling member 114, and refracts the light toward first emission surface 132. First incidence surface 131 is disposed so as to face the light-emitting surface of light-emitting element 112 and to intersect first central axis CA1. The shape of first incidence surface 131 is not limited as long as it can serve the above-described function. In the present embodiment, first incidence surface 131 is an internal surface of first recess 134 disposed so as to face light-emitting element 112. The surface of first incidence surface 131 may be a spherical surface, or an aspherical surface. In the present embodiment, first incidence surface 131 has a negative power for a part of the light emitted from light-emitting element 112. Specifically, first incidence surface 131 has a concave lens shape, and first incidence surface 131 is an aspherical surface.

First emission surface 132 emits, to the outside, the light having advanced inside first light flux controlling member 114. First emission surface 132 is disposed on the side (second light flux controlling member 115 side) opposite to first incidence surface 131. First emission surface 132 includes first inner emission surface 132a and first outer emission surface 132b.

First inner emission surface 132a is disposed so as to intersect first central axis CA1. The shape of first inner emission surface 132a is not limited as long as the emitted light is spread away from first central axis CA1. Specifically, first inner emission surface 132a is formed in a recessed shape in the case where it is intended to further spread, away from first central axis CA, the light flux reaching first inner emission surface 132a. In this case, first inner emission surface 132a has a negative power for the light reaching first inner emission surface 132a. On the other hand, in the case where it is intended to prevent excessive spreading of the light reaching first inner emission surface 132a from flux first central axis CA, first inner emission surface 132a is formed in a gentle projection shape. In this case, first inner emission surface 132a has a positive power for the light reaching first inner emission surface 132a. In each case, the light emitted from first inner emission surface 132a is controlled in such a manner that the light spreads away from first central axis CA1.

First outer emission surface 132b is disposed so as to surround first inner emission surface 132a at a position distanced from first central axis CA1 in comparison with first inner emission surface 132a. First outer emission surface 132b refracts (condenses), toward first central axis CA1 side, a part of the light incident on first incidence surface 131. In other words, first outer emission surface 132b has a positive power for the light which is emitted from light-emitting element 112 with a large emission angle with respect to first central axis CA1. First outer emission surface 132b has a convex lens shape, and first outer emission surface 132b is an aspherical surface.

Second light flux controlling member 115 controls the light emitted from first light flux controlling member 114 in such a manner that the light is approximately parallel light. As illustrated in FIG. 4A to FIG. 4D, second light flux controlling member 115 includes second incidence surface 141 and second emission surface 142. The shape of second light flux controlling member 115 is not limited as long as it can serve the above-described function. Second light flux controlling member 115 may include a convex lens surface in second incidence surface 141, and may include a convex lens surface in second emission surface 142. In addition, from the viewpoint of downsizing, second light flux controlling member 115 may include a refractive fresnel lens part, or a reflective fresnel lens part. In the present embodiment, second light flux controlling member 115 includes refractive fresnel lens part 145 in second emission surface 142. In comparison with second light flux controlling member 115 including a reflective type fresnel lens part, second light flux controlling member 115 including refractive fresnel lens part 145 can absorb assembling errors. It is to be noted that second light flux controlling member 115 may be provided with second flange 143. In addition, a second leg part (omitted in the drawing) for fixing second light flux controlling member 115 to substrate 111 may be provided on the rear side of second flange 143. The way of fixing second light flux controlling member 115 to substrate 111 is not limited, and second light flux controlling member 115 may be fixed by bonding, screw-fixing, fixing with a holder, or the like. For example, second light flux controlling member 115 and substrate 111 are fixed to each other by bonding the second leg part to substrate 111 with an adhesive agent.

Second incidence surface 141 allows the light emitted from first light flux controlling member 114 to enter second light flux controlling member 115 and refracts the light toward fresnel lens part 145. The shape of second incidence surface 141 is not limited as long as it can serve the above-described function. In the present embodiment, second incidence surface 141 is a plane surface.

Second emission surface 142 emits, to the outside, the light having advanced inside second light flux controlling member 115, and refracts the light in such a manner that the light is approximately parallel to first central axis CA1. Second emission surface 142 includes fresnel lens part 145. Fresnel lens part 145 includes a plurality of protrusions 146 which are concentrically disposed in a circular shape in plan view.

Each protrusion 146 includes refracting surface 147 that refracts incident light, and connection surface 148 that connects adjacent refracting surfaces 147. In protrusion 146, refracting surface 147 is disposed on the outer side, and connection surface 148 is disposed on the inner side (second central axis CA2 side). It is to be noted that a plurality of refracting surfaces 147 are designed such that the light emitted from light-emitting element 112 whose optical axis OA coincides with first central axis CA1 (second central axis CA2) of first light flux controlling member 114 (second light flux controlling member 115) becomes parallel light.

The light emitted from light-emitting element 112 is controlled by first light flux controlling member 114 and second light flux controlling member 115 so as to uniformly illuminate display region 121. From the viewpoint of improving the use efficiency of the light emitted from light-emitting element 112, it is preferable that the most part of the light emitted from first light flux controlling member 114 be incident on second light flux controlling member 115. In view of this, the distance between first light flux controlling member 114 and second light flux controlling member 115 is such that the most part of the light emitted from first light flux controlling member 114 is incident on light second light flux controlling member 115.

Figure 5:
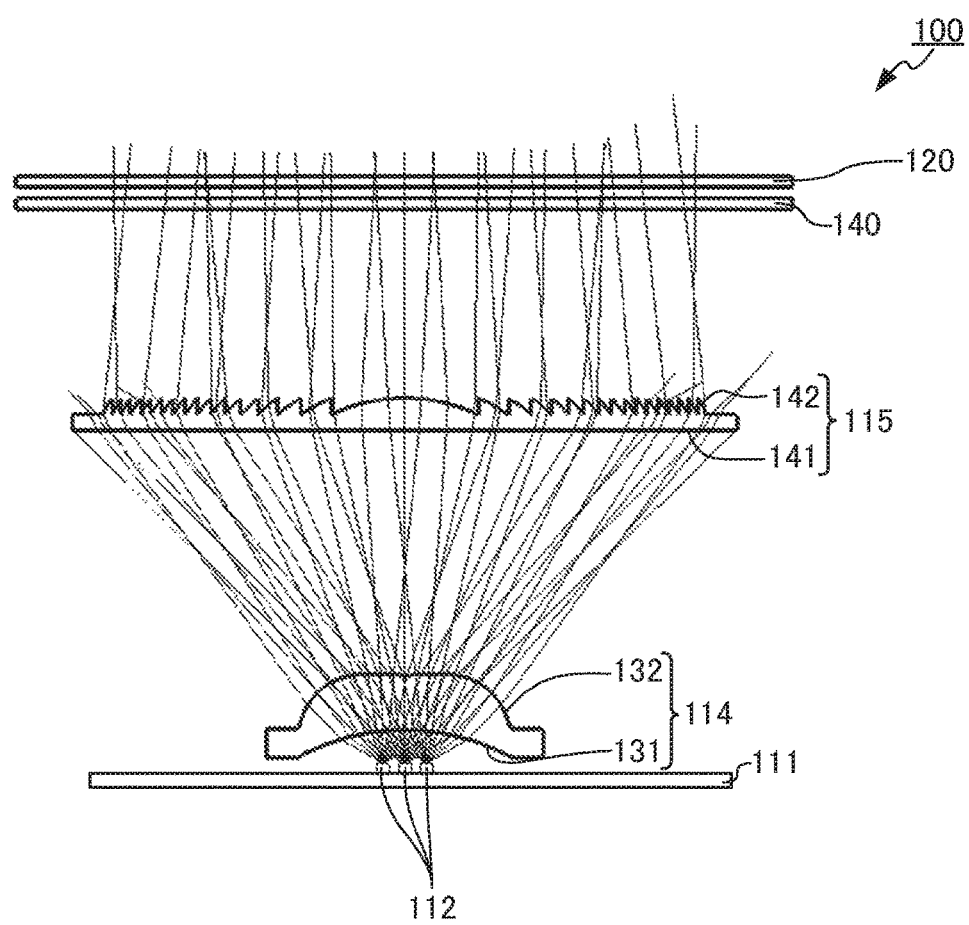
FIG. 5 illustrates light paths in the display device.

FIG. 5 illustrates light paths in display device 100. In FIG. 5, hatching is omitted to illustrate light paths. As illustrated in FIG. 5, the light emitted from light-emitting elements 112 is controlled in such a manner that the light is mixed at first light flux controlling member 114, and is emitted from first emission surface 132. The light emitted from first light flux controlling member 114 reaches second light flux controlling member 115. At this time, the light beam density of the light reaching second light flux controlling member 115 is controlled in such a manner that the light beam density is low at a center portion and high at a peripheral portion. In other words, at second incidence surface 141 of second light flux controlling member 115, the luminous intensity is low at a center portion and high at a peripheral portion. The light reaching second light flux controlling member 115 is controlled by second light flux controlling member 115 in such a manner that the light is approximately parallel (in such a manner that the light beam density is uniform over the entire surface of display member 120), and is emitted from second emission surface 142. The light emitted from second emission surface 142 illuminates display member 120 in such a manner as to uniformize the luminance In the display device 100, light-emitting element 112 and light flux controlling member 113 are disposed in such a manner as to satisfy the following Expression (1).

$$-0.6 < d/f < 0 \qquad (1)$$

where d is the distance between first central axis CA1 of first light flux controlling member 114 and optical axis OA of light-emitting element 112 which is the most remote light-emitting element from central axis CA1 of first light flux controlling member 114 (hereinafter also simply referred to as "distance d"). In addition, f is the focus distance of first light flux controlling member 114 (hereinafter referred to also simply as "focus distance f").

Figure 6A:
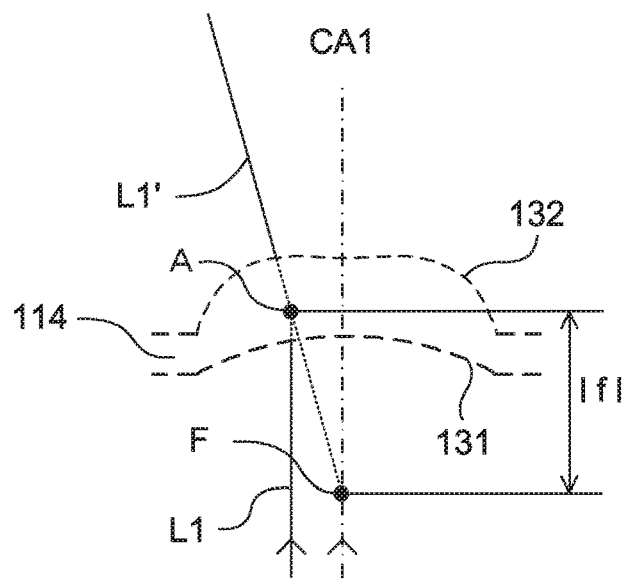
FIG. 6A and FIG. 6B are drawings for describing a relationship between the light flux controlling member and the light-emitting element.
Figure 6B:
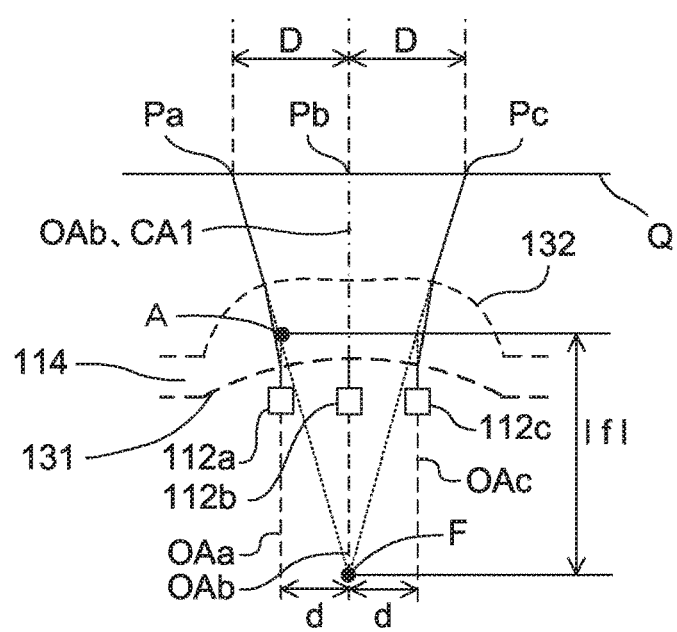
Figure 7A:
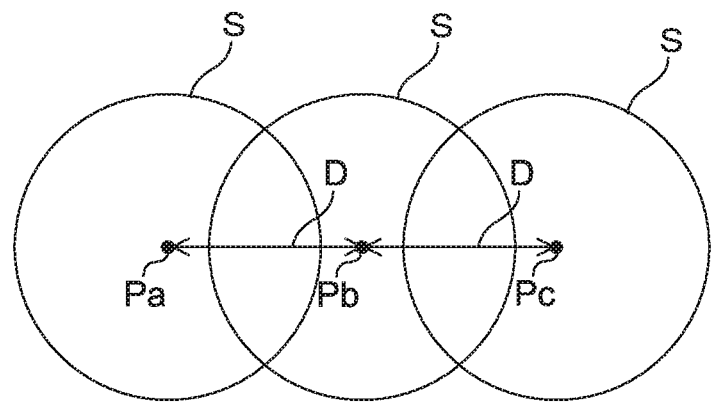
FIG. 7A and FIG. 7B are drawings for describing an illumination region.
Figure 7B:
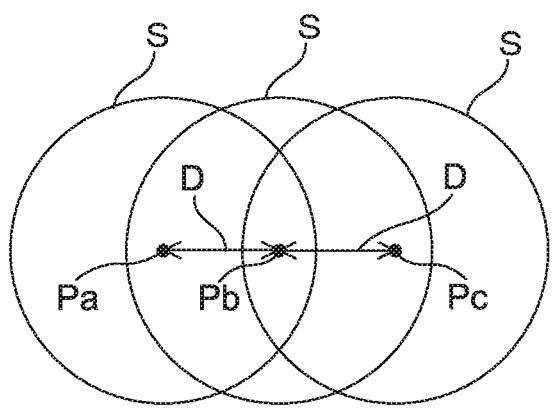

With reference to FIG. 6A and FIG. 6B, a relationship between light-emitting element 112 and light flux controlling member 113 is described. FIG. 6A is a drawing for describing focus distance f of first light flux controlling member 114, and FIG. 6B is a drawing for describing a relationship between focus distance f and distance d. FIG. 7A and FIG. 7B are drawings for describing illumination region S. FIG. 7A is a drawing for describing an illumination region in the case where distance d is long, and FIG. 7B is a drawing for describing an illumination region in the case where distance d is short.

First light flux controlling member 114 according to the present embodiment functions in a direction of spreading the light emitted from light-emitting element 112 as a lens in its entirety, and therefore focus distance f is defined as follows. As illustrated in FIG. 6A, with regard to focus distance f of first light flux controlling member 114, first, it is assumed that virtual incident light L1 that is parallel with first central axis CA1 of first light flux controlling member 114 comes from first incidence surface 131 side. Next, virtual emission light L1' that is virtual incident light L1 emitted from first emission surface 132 is assumed. Next, the intersection of virtual incident light L1 extended in the incident direction and virtual emission light L1' extended in the direction opposite to the emission direction is set as main point A. Next, the intersection of a virtual line obtained by further extending virtual emission light L1' emitted from first emission surface 132 in the direction opposite to the emission direction, and first central axis CA1 of first light flux controlling member 114 is set as focus F. Here, the distance between main point A and focus F along first central axis CA1 is focus distance f. In the present embodiment, focus distance f has a negative value.

Next, a relationship between focus distance f and distance d is described. Here, it is assumed that three light-emitting elements 112a, 112b and 112c arranged in a line in such a manner that the center-to-center distance of the optical axes is distance d, and one first light flux controlling member 114 are provided as illustrated in FIG. 6B. In addition, it is assumed that optical axis OAb of light-emitting element 112b disposed at the center coincides with first central axis CA1 of first light flux controlling member 114. That is, light-emitting element 112 which is the most remote light-emitting element from first central axis CA1 of first light flux controlling member 114 is light-emitting element 112a (light-emitting element 112c). Further, the arrival points of the virtual emission light emitted from light-emitting elements 112a, 112b and 112c on virtual illuminated surface Q (which corresponds to diffusion plate 140 the present embodiment) are Pa, Pb and Pc, respectively.

As illustrated in FIG. 6B, when distance d (the center-to-center distance of light-emitting elements 112 adjacent to each other) between first central axis CA1 of first light flux controlling member 114 and optical axis OA of light-emitting element 112a (112c), which is the most remote light-emitting element from first central axis CA1, increases, distance D between the arrival points of the light beams emitted from light-emitting elements 112a, 112b and 112c on the virtual plane increases. Here, since the light emitted from light-emitting elements 112a, 112b and 112c illuminates predetermined regions (illumination regions S) on the virtual plane, the overlapping area of illumination regions S illuminated by light-emitting elements 112a, 112b and 112c decreases (see FIG. 7A). Conversely, when distance d is reduced, the overlapping area of illumination regions S illuminated by light-emitting elements 112a, 112b and 112c increases (see FIG. 7B). In this manner, the overlapping area of the illumination regions of light-emitting elements 112a, 112b and 112c can be adjusted by adjusting distance d.

On the other hand, as illustrated in FIG. 6B, when focus distance f of first light flux controlling member 114 is reduced, distance D between the arrival points of the light beams emitted from light-emitting elements 112a, 112b and 112c on the virtual plane increases. Here, since the light emitted from light-emitting elements 112a, 112b and 112c illuminates predetermined regions (illumination regions S) on the virtual plane, the overlapping area of illumination regions S illuminated by light-emitting elements 112a, 112b and 112c decreases (see FIG. 7A). Conversely, when focus distance f is increased, the overlapping area of illumination regions S illuminated by light-emitting elements 112a, 112b and 112c increases (see FIG. 7B). In this manner, the overlapping area of the illumination regions of light-emitting elements 112a, 112b and 112c can be adjusted by adjusting focus distance f.

As described above, distance d and focus distance f largely affect the uniformity on display member 120 described later. To be more specific, when d/f is reduced to −0.6 or smaller in response to the increase in d, the overlapping region of illumination regions S of the light emitted from light-emitting elements 112 is reduced. In particular, in the case where the screen has a rectangular shape, the overlapping area is reduced in the longitudinal (long side) direction than in the short (short side) direction, and consequently sufficient luminance cannot be ensured at end portions in the longitudinal direction. On the other hand, when the peripheral regions are brightened by reducing f, the absolute value of d/f is further reduced, and the overlapping region of illumination regions S is further reduced.

When d/f is greater than 0, the positive power of first light flux controlling member 114 is excessively high, and the light beam density at the center portion is higher than that of the peripheral portions, thus leading to high luminance at the center portion.

On the other hand, when d/f satisfies −0.6<d/f<0, the illumination regions of the light emitted from light-emitting elements 112 appropriately overlap each other, and as a result, luminance unevenness is suppressed.

(Effect)

As described above, in display device 100 including the surface light source device according to Embodiment 1, −0.6<d/f<0 is satisfied by focus distance f of first light flux controlling member 114, and distance d between first central axis CA1 of first light flux controlling member 114 and optical axis OA of light-emitting element 112 which is the most remote light-emitting element from first central axis CA1 of first light flux controlling member 114. As stated in Example 1 later, by setting d/f to a value within a predetermined range, display member 120 can be uniformly illuminated even in the case where a plurality of light-emitting elements 112 are used.

In addition, since second light flux controlling member 115 includes refractive fresnel lens part 145, mounting errors can be absorbed when display device 100 is mounted.

(Embodiment 2)

In Embodiment 2, a condition is described where luminance unevenness is not caused not only as viewed in the front side of display region 121, but also as viewed from a position shifted from the front side of display region 121 in display device 100 according to Embodiment 1. It is to be noted that, since the configuration of display device 100 is identical to that of display device 100 according to Embodiment 1, the same reference numerals are used and the description thereof is omitted.

As described above, display device 100 includes surface light source device 110, and display member 120 including display region 121 (see FIG. 2A). In addition, surface light source device 110 includes light-emitting device 130 and diffusion plate 140. In addition, light-emitting device 130 includes a plurality of light-emitting elements 112 and light flux controlling member 113 including first light flux controlling member 114 and second light flux controlling member 115. Light-emitting device 130 is disposed on substrate 111.

In Embodiment 2, light-emitting elements 112 are disposed in such a manner that optical axis OA of one of the light-emitting elements 112 coincides with first central axis CA1 of first light flux controlling member 114 and second central axis CA2 of second light flux controlling member 115. In addition, the intensity of the light emitted from light-emitting elements 112 is highest in the direction along first central axis CA1.

In addition, as described above, in display device 100, light-emitting element 112 and light flux controlling member 113 are disposed in such a manner as to satisfy the following Expression (1).

$$-0.6 < d/f < 0 \tag{1}$$

Display device 100 according to Embodiment 2 is configured to satisfy the following Expressions (2) to (5) in addition to Expression (1).

Figure 8:
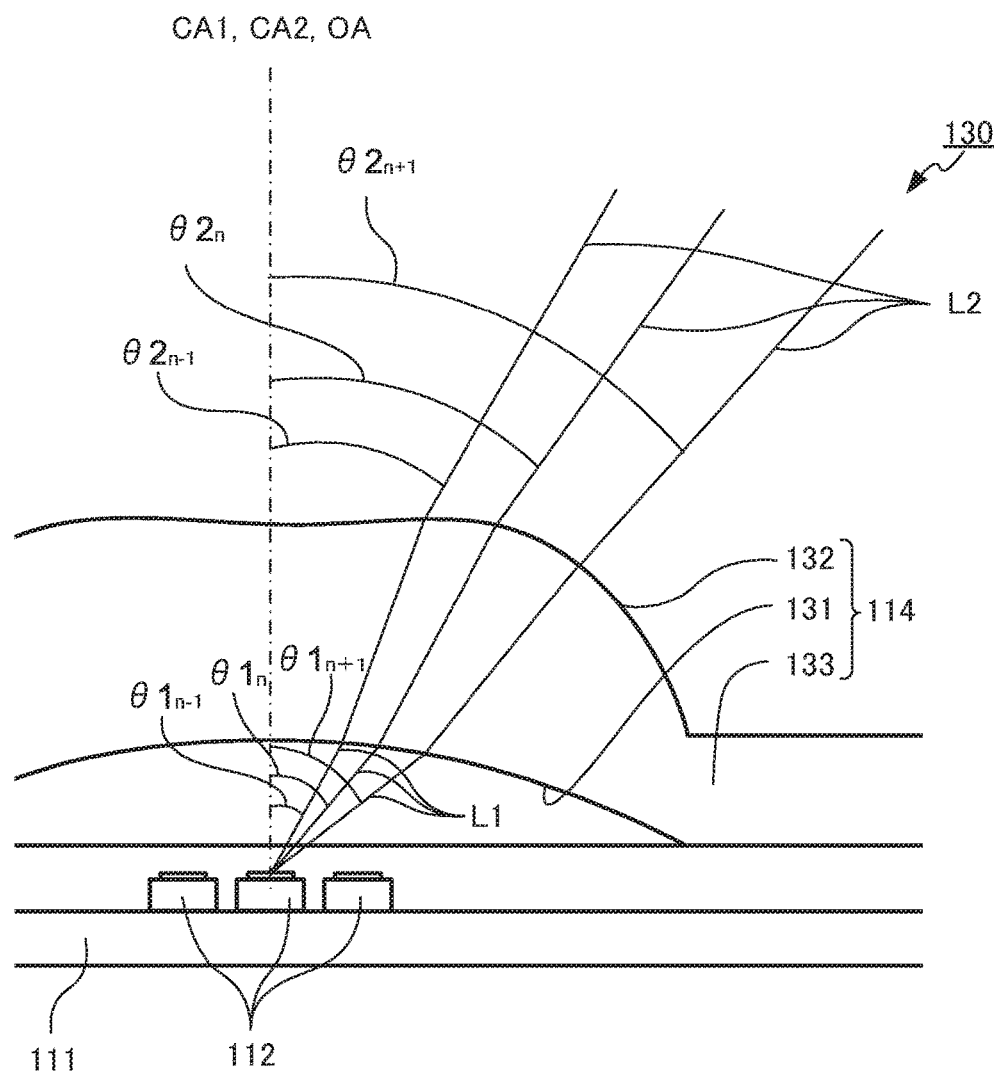
FIG. 8 is a drawing for describing Expressions (2) and (3)
Figure 9:
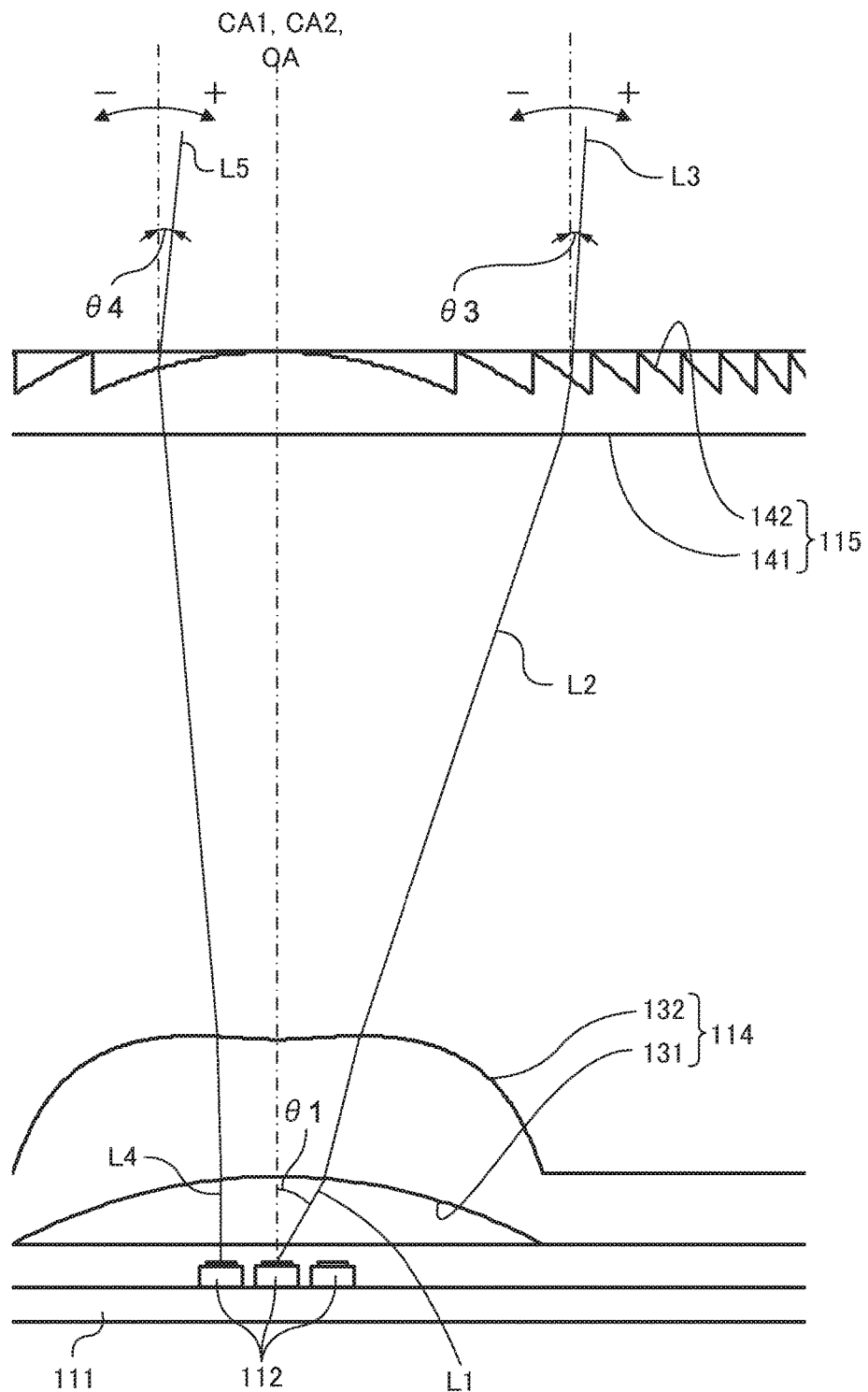
FIG. 9 is a drawing for describing Expressions (4) and (5)

FIG. 8 is a drawing for describing Expressions (2) and (3). FIG. 9 is a drawing for describing Expressions (4) and (5). It is to be noted that, in FIG. 8, hatching of substrate 111, light-emitting element 112 and first light flux controlling member 114 is omitted to illustrate light paths. In addition, in FIG. 9, hatching of substrate 111, light-emitting element 112, first light flux controlling member 114 and second light flux controlling member 115 is omitted to illustrate light paths.

As illustrated in FIG. 8, when $\theta1_n$ represents an emission angle of first light beam L1 emitted from the light emission center of light-emitting element 112 whose optical axis OA coincides with first central axis CA1, and $\theta2_n$ represents an angle to first central axis CA1 of second light beam L2, which is generated when first light beam L1 controlled by first light flux controlling member 114 is emitted from first light flux controlling member 114, light-emitting device 130 according to Embodiment 2 further satisfies the following Expression (2). In addition, n represents an arbitrary number of a light beam in a cross-section including first central axis CA and second central axis CA2.

$$\frac{\Delta(\theta2_{n+1} - \theta2_n)}{\Delta(\theta1_{n+1} - \theta1_n)} > 0 \qquad (2)$$

where $0° < \theta1_n < \theta1_{n+1} < 60°$, and $\theta2_n$ represents an angle corresponding to $\theta1_n$ of a light beam.

In this manner, illumination apparatus 100 according to Embodiment 2 has a configuration in which $\theta2_n$ increases along with the increase in $\theta1_n$. With this configuration, second light beam L2, which is generated when the light is emitted from first emission surface 132 of first light flux controlling member 114, does not overlap, and thus continuous light can be incident on second light flux controlling member 115.

In addition, light-emitting device 130 according to Embodiment 2 further satisfies the following Expression (3).

$$\frac{\Delta(\theta2_n - \theta2_{n-1})}{\Delta(\theta1_n - \theta1_{n-1})} \geq \frac{\Delta(\theta2_{n+1} - \theta2_n)}{\Delta(\theta1_{n+1} - \theta1_n)} \qquad (3)$$

where $0° < \theta1_{n-1} < \theta1_n < \theta1_{n+1} < 60°$.

In this manner, light-emitting device 130 has a configuration in which the ratio of the increase in $\theta2_n$ to the increase in $\theta1_n$ decreases along with the increase in $\theta1_n$. This means that, when the center portion is located on first central axis CA1 side and the peripheral portion is located on first flange 133 side, the light beam density of second light beam L2 emitted from the peripheral portion of first emission surface 132 is higher than that of second light beam L2 emitted from the center portion of first emission surface 132. With this configuration, the light beam density at the center portion where the light beam having a high intensity arrives is low, and the light beam density at the peripheral portion where the light beam having a low intensity arrives is high. Accordingly, the illuminance at second incidence surface 141 of second light flux controlling member 115 is uniformized.

As illustrated in FIG. 9, when $\theta3$ represents the angle to first central axis CA1 of third light beam L3, which is generated when second light beam L2 controlled by second light flux controlling member 115 is emitted from second emission surface 142 of second light flux controlling member 115, it is preferable that light-emitting device 130 satisfy the following Expression (4).

$$-6° < \theta3 < 10° \qquad (4)$$

where $0° < \theta1 < 40°$, and $\theta3$ represents an angle to first central axis CA of third light beam L3 emitted from second light flux controlling member 115. Here, $\theta3$ is set as follows: with respect to 0° set as the angle of light L0 which advances in parallel with first central axis CA1, the angle to first central axis CA1 of third light beam L3 which approaches first central axis CA1 has a negative "−" value, and the angle to first central axis CA1 of third light beam L3 which advances away from first central axis CA1 has a positive "+" value.

In this manner, third light beam L3, which is generated when the light is emitted from second light flux controlling member 115, is emitted in a direction approximately parallel to first central axis CA1. It is to be noted that when $\theta3$ is 10° or greater, the degree of scattering is significant, and third light beam L3 significantly advances away from first central axis CA1. With this configuration, first central axis CA1 side (center portion) is darkened. On the other hand, when $\theta3$ is smaller than −6°, the degree of condensing is significant, and third light beam L3 approaches first central axis CA1. Consequently, the regions (peripheral portions) distanced from first central axis CA1 are darkened.

In addition, light-emitting device 130 according to Embodiment 2 further satisfies the following Expression (5) in which $\theta4$ represents the angle to first central axis CA1 of fifth light beam L5, which is generated when fourth light beam L4 emitted in parallel with first central axis CA1 from the light emission center of light-emitting element 112 which is the most remote light-emitting element from first central axis CA1 is controlled by first light flux controlling member 114 and second light flux controlling member 115 and thereafter emitted from second light flux controlling member 115.

$$3° < \theta4 < 10° \qquad (5)$$

where, with respect to 0° set as the angle of light which advances in parallel with the first central axis, the angle to the first central axis of the fifth light beam which approaches the first central axis has a positive "+" value, and the angle to the first central axis of the fifth light beam which advances away from the first central axis has a negative "−" value.

In this manner, in light-emitting device 130, a part of light emitted from light-emitting element 112 which is the most remote light-emitting element from first central axis CA1 is emitted from second light flux controlling member 115 in a direction tilted to first central axis CA1, and therefore luminance unevenness can be suppressed even when display region 121 is viewed in an oblique direction. It is to be noted that, when $\theta4$ is 3° or smaller, the quantity of the light which is emitted in an oblique direction with respect to first central axis CA1 is small, and consequently luminance unevenness is caused when display region 121 is viewed in an oblique direction. On the other hand, when $\theta4$ is 10° or greater, the light emitted from second light flux controlling member 115 excessively advances toward first central axis CA1 side, and the peripheral portions are darkened as viewed from the front side.

(Effect)

As described above, in display device 100 including the surface light source device according to Embodiment 2, light-emitting device 130 further satisfies Expressions (2) to (5). As described in Example 2 later, when light-emitting device 130 further satisfies Expressions (2) to (5), luminance unevenness is suppressed even in the case where display region 121 is viewed from an oblique direction as well as the case where display region 121 is viewed from the front side.

While the present invention is described in detail below based on Examples, the present invention is not limited to the Examples.

EXAMPLES

Example 1

In Example 1, relationships between distance d with respect to focus distance f, and the luminance distribution in display region 121 of display member 120 were examined in display device 100.

(Configuration of Display Device)

Figure 10:
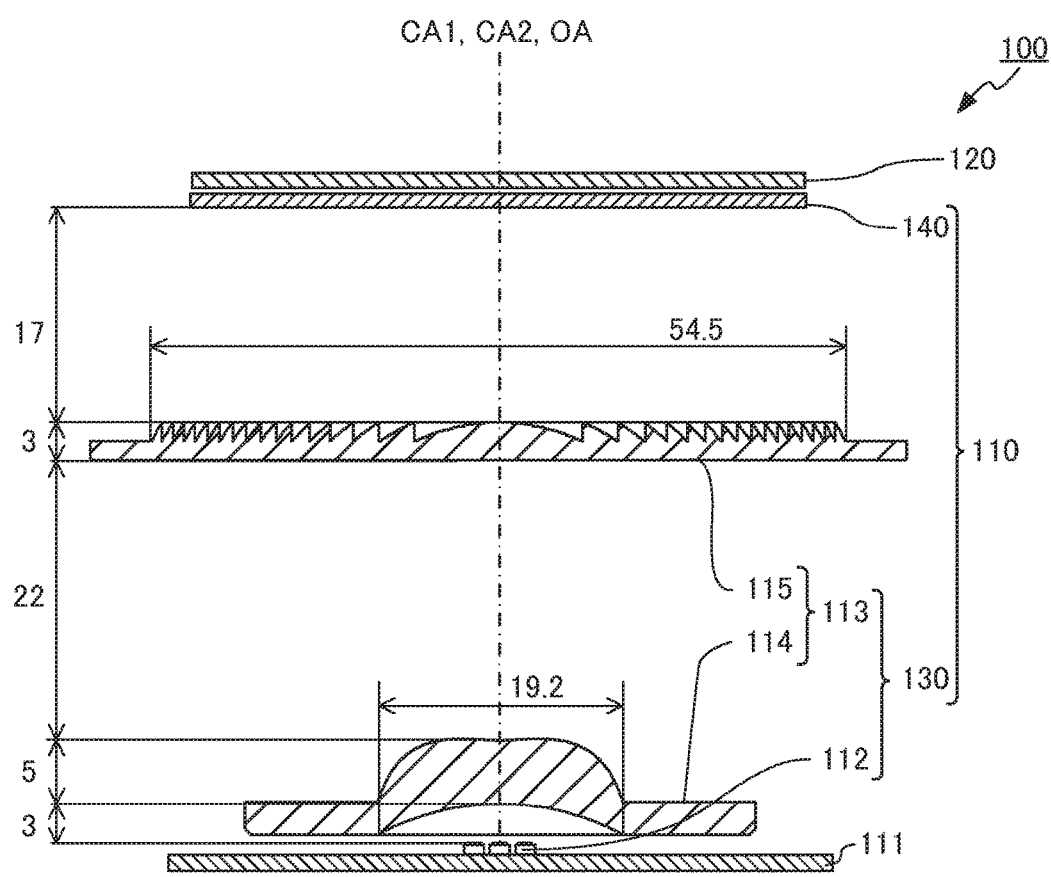
FIG. 10 is a schematic view illustrating a configuration of a display device used in Example 1 and Example 2.

FIG. 10 is a schematic view illustrating a configuration of display device 100 used in the example. As illustrated in FIG. 10, display device 100 includes surface light source device 110 and display member 120. Surface light source device 110 includes light-emitting element 112 and light flux controlling member 113. Light flux controlling member 113 includes first light flux controlling member 114 and second light flux controlling member 115. It is to be noted that the dimension shown in FIG. 10 indicates the dimension (mm) of the display device "No. 7" described later.

(Calculation of Luminance)

Next, the luminance distribution in the display region of each display device was determined by a simulation. In the simulation, the luminance distributions of sixteen display devices shown in Table 1 were determined. Table 1 shows focus distance f, distance d, and distance d/focus distance f of each display device.

TABLE 1

| | Display device No. | Focus distance f | Distance d | Distance d/Focus distance f |
|---|---|---|---|---|
| Example | 1 | −3.661 | 2 | −0.546 |
| | 2 | −4.368 | 2 | −0.458 |
| | 3 | −5.376 | 2 | −0.372 |
| | 4 | −6.471 | 2 | −0.309 |
| | 5 | −7.323 | 2 | −0.273 |
| | 6 | −10.286 | 2 | −0.194 |
| | 7 | −12.370 | 2 | −0.162 |
| | 8 | −15.030 | 2 | −0.133 |
| | 9 | −19.570 | 2 | −0.102 |
| | 10 | −26.936 | 2 | −0.074 |
| | 11 | −105.000 | 2 | −0.019 |
| Comparative example | 12 | −2.452 | 2 | −0.816 |
| | 13 | 26.401 | 2 | 0.076 |
| | 14 | 18.140 | 2 | 0.110 |
| | 15 | 13.212 | 2 | 0.151 |
| | 16 | 10.166 | 2 | 0.197 |

Figure 11A:
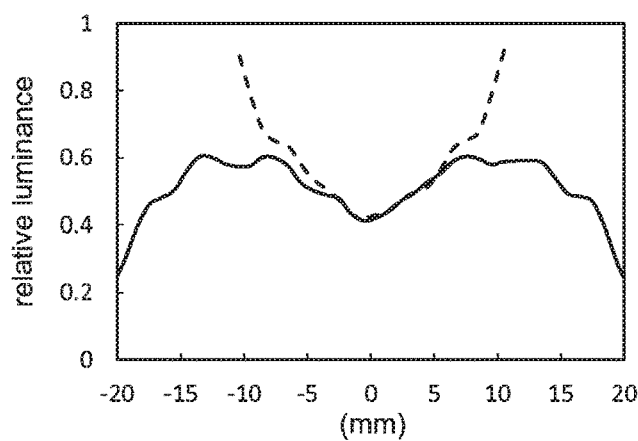
FIG. 11A to FIG. 11C are graphs showing a luminance distribution in the display region of the illuminated member.
Figure 11B:
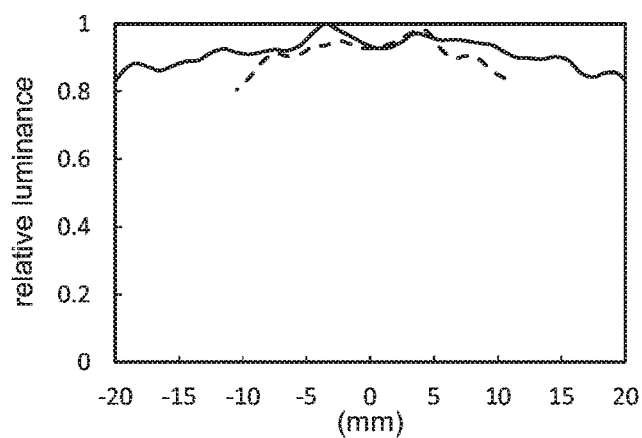
Figure 11C:
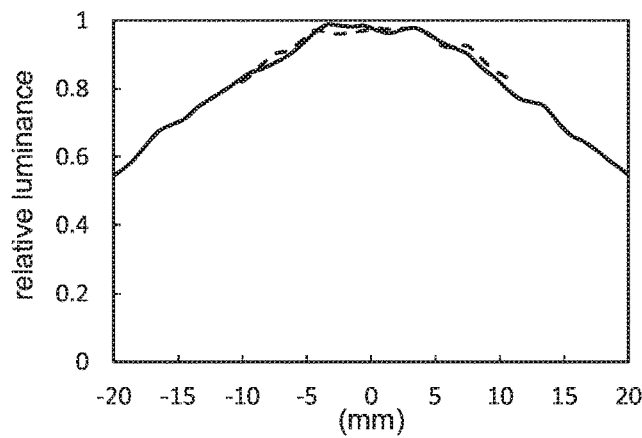
Figure 12A:
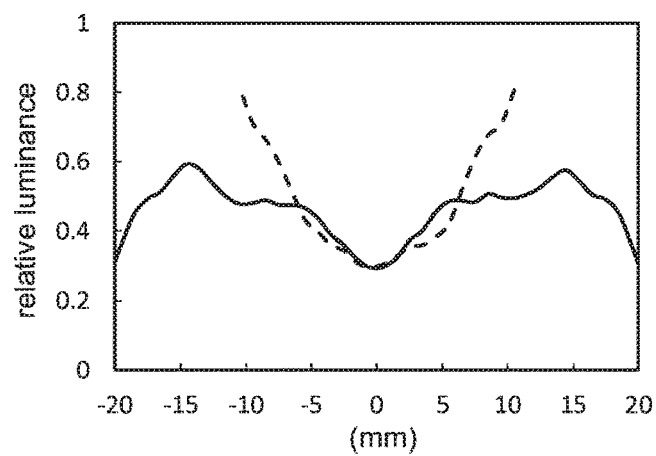
FIG. 12A to FIG. 12C are graphs showing an luminance distribution in the display region of the illuminated member.
Figure 12B:
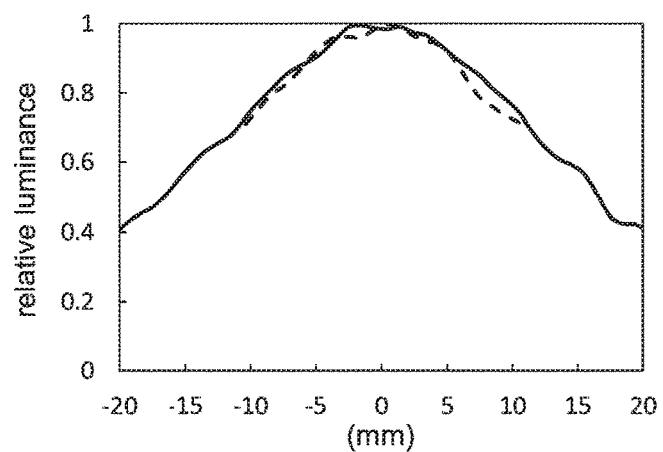
Figure 12C:
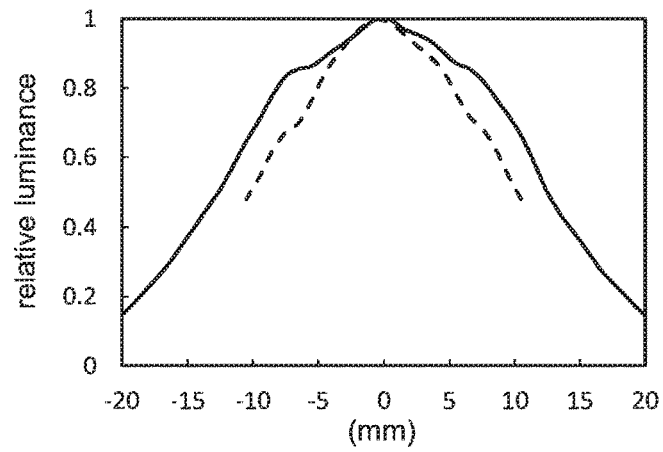

FIG. 11A to FIG. 12C are graphs showing luminance distributions in the display regions of representative display devices. FIG. 11A shows a luminance distribution of the display device "No. 1," FIG. 11B shows a luminance distribution of the display device "No. 7," and FIG. 11C shows a luminance distribution of the display device "No. 11." In addition, FIG. 12A shows a luminance distribution of the display device "No. 12," FIG. 12B shows a luminance distribution of the display device "No. 13," and FIG. 12C shows a luminance distribution of the display device "No. 16." In each graph, the ordinate indicates a relative luminance of the display device "No. 7" relative to the maximum luminance set as 1, and the abscissa indicates a distance from the center of the display region. In addition, in each graph, the solid line indicates a relative luminance in the long side direction of the display region illustrated in FIG. 2B, and the broken line indicates a relative luminance in the short side direction of the display region illustrated in FIG. 2B.

(Calculation of Uniformity)

Next, the uniformity in display region 121 was calculated. The uniformity was calculated with the following Expression (6).

Uniformity=Minimum luminance/Average luminance (6)

Here, the minimum luminance is a minimum value of the luminance in the display region, and the average luminance is an average value of the luminance in the display region. Generally, the uniformity required for an HUD is 0.7 or greater, and therefore the devices with a uniformity of 0.7 or greater were judged to be acceptable in the present example.

Figure 13:
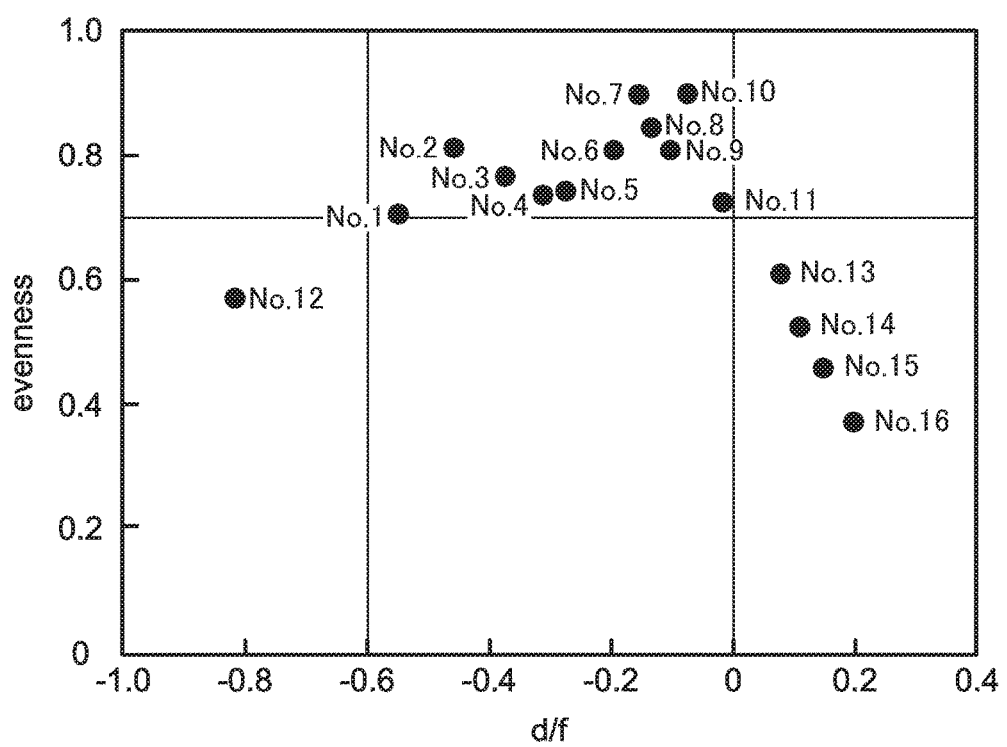
FIG. 13 is a graph showing a relationship between d/f and the uniformity in the display device.

Table 2 and FIG. 13 show relationships between distance d/focus distance f and the uniformity in each display device. FIG. 13 is a plot of the results collected in Table 2. In FIG. 13, the abscissa indicates distance d/focus distance f (d/f), and the ordinate indicates the uniformity (evenness).

TABLE 2

| | Display device No. | Distance d/ Focus distance f | Uniformity |
|---|---|---|---|
| Example | 1 | −0.546 | 0.71 |
| | 2 | −0.458 | 0.82 |
| | 3 | −0.372 | 0.77 |
| | 4 | −0.309 | 0.74 |
| | 5 | −0.273 | 0.74 |
| | 6 | −0.194 | 0.81 |
| | 7 | −0.162 | 0.90 |
| | 8 | −0.133 | 0.85 |
| | 9 | −0.102 | 0.81 |
| | 10 | −0.074 | 0.90 |
| | 11 | −0.019 | 0.73 |
| Comparative example | 12 | −0.816 | 0.57 |
| | 13 | 0.076 | 0.61 |
| | 14 | 0.110 | 0.52 |
| | 15 | 0.151 | 0.46 |
| | 16 | 0.197 | 0.37 |

As shown in Table 2 and FIG. 13, the uniformity of the display device "No. 12" having a d/f of −0.816 was 0.57. One conceivable reason for this is that the negative power of the first light flux controlling member is excessively high for the distance d between the optical axes of adjacent light-emitting elements, and accordingly the light beam density at the center portion of the illuminated member (display region) is lower than the light beam density at the peripheral portion thereof (see FIG. 12A).

In addition, as shown in Table 2 and FIG. 13, the uniformity of display devices "Nos. 13 to 16" having a positive d/f was smaller than 0.7. One conceivable reason for this is that the positive power of the first light flux controlling member is excessively high for the distance d between the optical axes of adjacent light-emitting elements, and accordingly the light beam density at the center portion of the illuminated member (display region) is higher than the light beam density at the peripheral portion, thus darkening the peripheral portion (see FIG. 12B and FIG. 12C).

On the other hand, the uniformities of the display devices "Nos. 1 to 11," which satisfy −0.6<d/f<0, were 0.7 or greater as shown in Table 2 and FIG. 13. This result means that the light beam density at the center portion of the illuminated member (display region) and the light beam density at the peripheral portion thereof were approximately equal to each other, and the luminance of the illuminated member was uniformized in its entirety (see FIG. 11A to FIG. 11C).

It was thus confirmed that when −0.6<d/f<0 is satisfied by focus distance f of first light flux controlling member 114, and distance d between first central axis CA1 of first light flux controlling member 114 and optical axis OA of light-emitting element 112 which is the most remote light-emitting element from first central axis CA1 of first light flux controlling member 114, it is possible to uniformly illuminate the display region with less luminance unevenness.

Example 2

In Example 2, the relationship between θ4 in display device 100, and the ratio of the uniformity of display region 121 viewed from the front side to the uniformity of display region 121 viewed in the direction tilted by 5° was examined. It is to be noted that the configuration of display device 100 used in Example 2 is identical to that of Example 1.
(Calculation of Luminance)

Figure 14A:
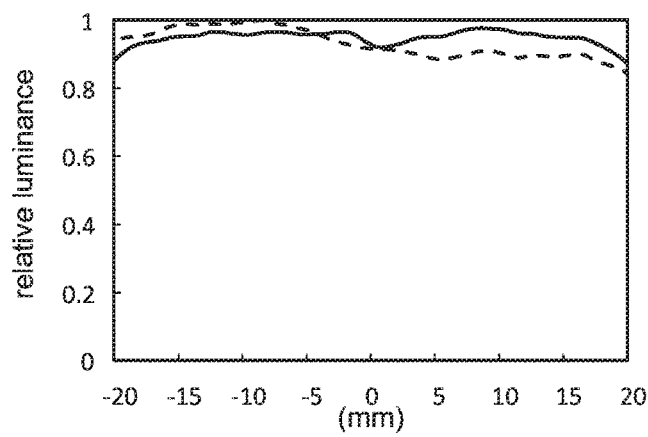
FIG. 14A to FIG. 14C are graphs showing a luminance distribution in the display region of representative display devices.
Figure 14B:
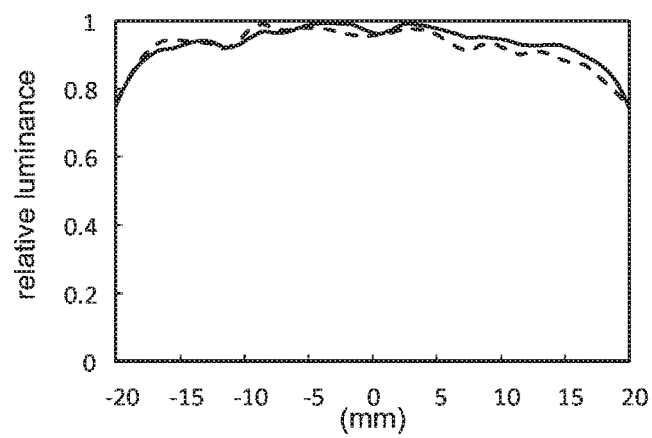
Figure 14C:
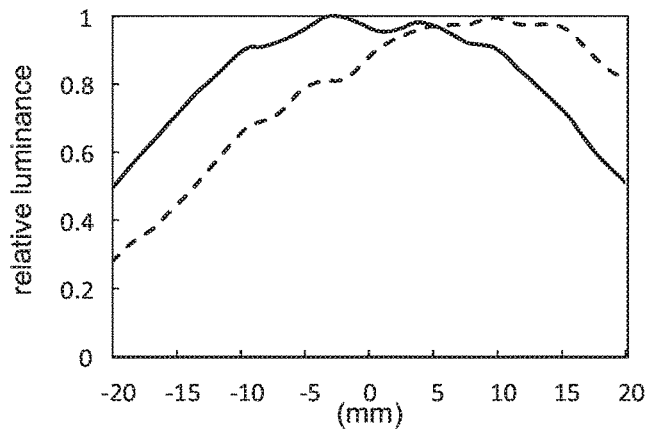

The luminance distribution in the display region of each display device was determined by a simulation. In the simulation, the luminance distributions of the sixteen display devices shown in Table 3 were determined. FIG. 14A to FIG. 14C are graphs showing luminance distributions in the display regions of representative display devices. FIG. 14A is a graph showing a luminance distribution of the display device "No. 19," FIG. 14B is a graph showing a luminance distribution of the display device "No. 23," and FIG. 14C is a graph showing a luminance distribution of the display device "No. 31." In each graph, the ordinate indicates a relative luminance of each display device relative to the maximum luminance set as 1, and the abscissa indicates the distance from the center of the display region in the long side direction illustrated in FIG. 2B. In addition, in each graph, the solid line indicates a relative luminance of the display region as viewed from the front side, and the broken line indicates the relative luminance of the display region as viewed in the direction tilted by 5°.
(Calculation of Uniformity)

Figure 15:
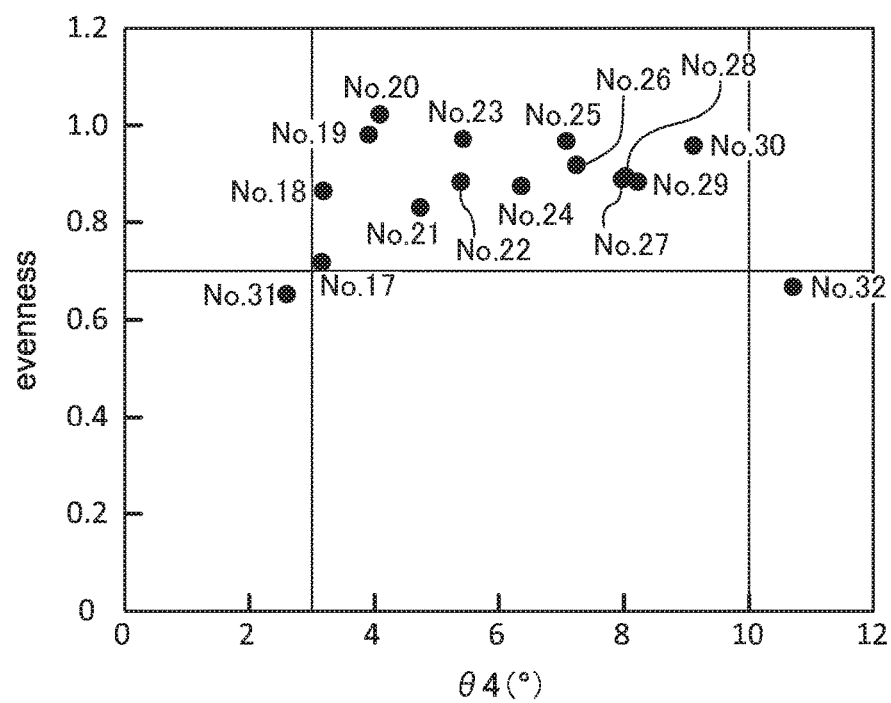
FIG. 15 is a graph showing a relationship between θ4 and uniformity (5°)/uniformity (0°) in the display device.

Next, the uniformity in the display region was calculated in the same manner as in Example 1. Table 3 and FIG. 15 show relationships between uniformity (5°)/uniformity (0°) and θ4 in each display device. FIG. 15 is a plot of the results collected in Table 3. In FIG. 15, the abscissa indicates θ4, and the ordinate indicates uniformity (5°)/uniformity (0°). Here, "uniformity (0°)" means the uniformity in the case where the display region is viewed from the front side. In addition, "the uniformity (5°)" means the uniformity in the case where the display region is viewed in the direction tilted by 5°. It is to be noted that, although not shown herein, the display devices "Nos. 17 to 32" satisfy Expressions (2) to (4). In addition, in view of the use in a HUD, the devices with "uniformity (5°)/uniformity (0°)" of 0.7 or greater were judged to be acceptable in the present example.

TABLE 3

|  | Display device No. | Distance d | θ4 | Uniformity (0°) | (5°) | (5°)/(0°) |
|---|---|---|---|---|---|---|
| Example | 17 | 2 | 3.17 | 0.72 | 0.52 | 0.72 |
|  | 18 | 2 | 3.20 | 0.90 | 0.78 | 0.86 |
|  | 19 | 2 | 3.92 | 0.95 | 0.93 | 0.98 |
|  | 20 | 2 | 4.10 | 0.88 | 0.90 | 1.02 |
|  | 21 | 3 | 4.74 | 0.82 | 0.68 | 0.83 |
|  | 22 | 3 | 5.39 | 0.86 | 0.76 | 0.88 |
|  | 23 | 3 | 5.43 | 0.92 | 0.89 | 0.97 |
|  | 24 | 3 | 6.37 | 0.86 | 0.75 | 0.87 |
|  | 25 | 3 | 7.09 | 0.68 | 0.66 | 0.97 |
|  | 26 | 4 | 7.25 | 0.81 | 0.74 | 0.92 |
|  | 27 | 4 | 7.89 | 0.82 | 0.73 | 0.89 |
|  | 28 | 4 | 8.03 | 0.74 | 0.66 | 0.89 |
|  | 29 | 4 | 8.23 | 0.79 | 0.70 | 0.88 |
|  | 30 | 4 | 9.12 | 0.63 | 0.61 | 0.96 |
| Comparative example | 31 | 2 | 2.61 | 0.64 | 0.42 | 0.65 |
|  | 32 | 4 | 10.72 | 0.41 | 0.28 | 0.67 |

Figure 16A:
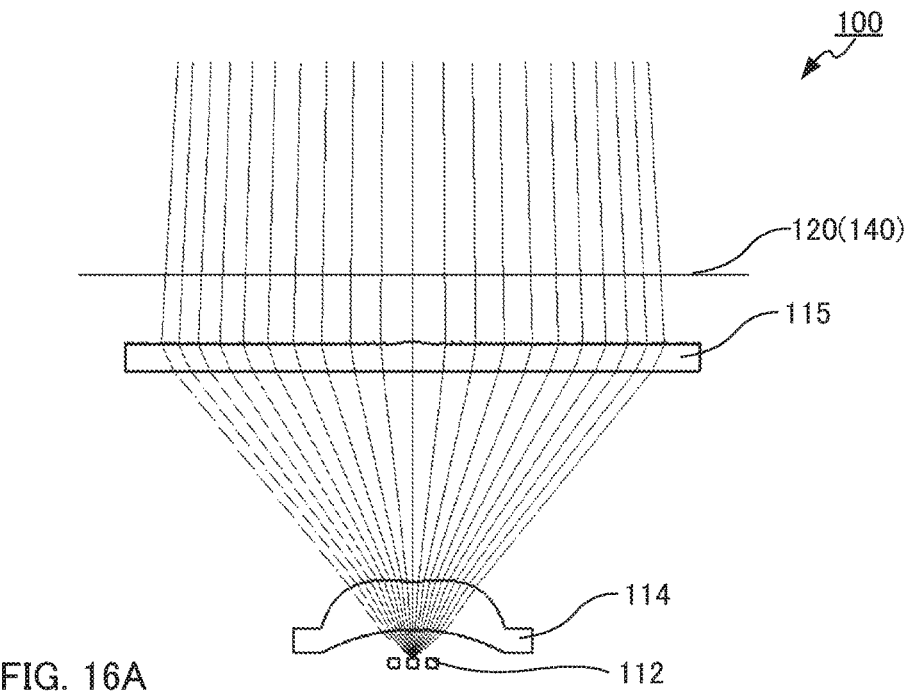
FIG. 16A and FIG. 16B illustrate light paths in display device "No. 19;"
Figure 16B:
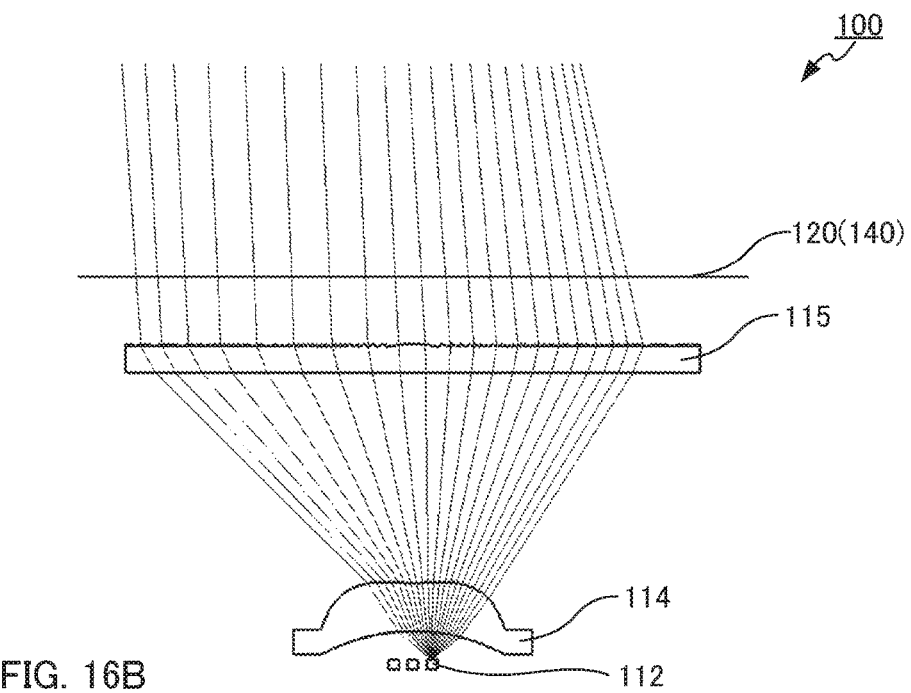
Figure 17A:
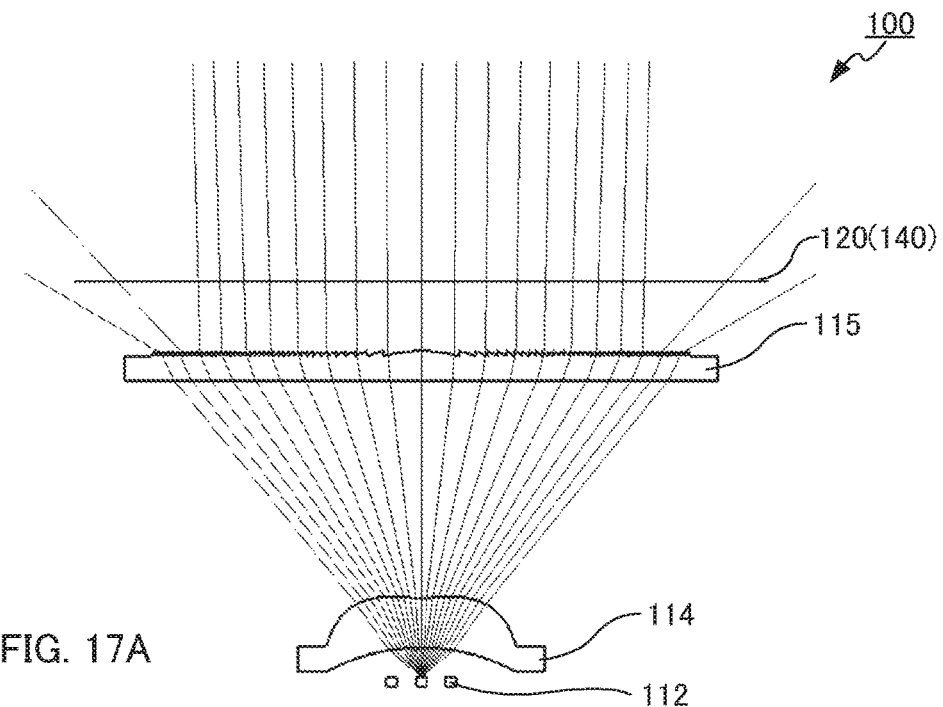
FIG. 17A and FIG. 17B illustrate light paths in the display device "No. 23.
Figure 17B:
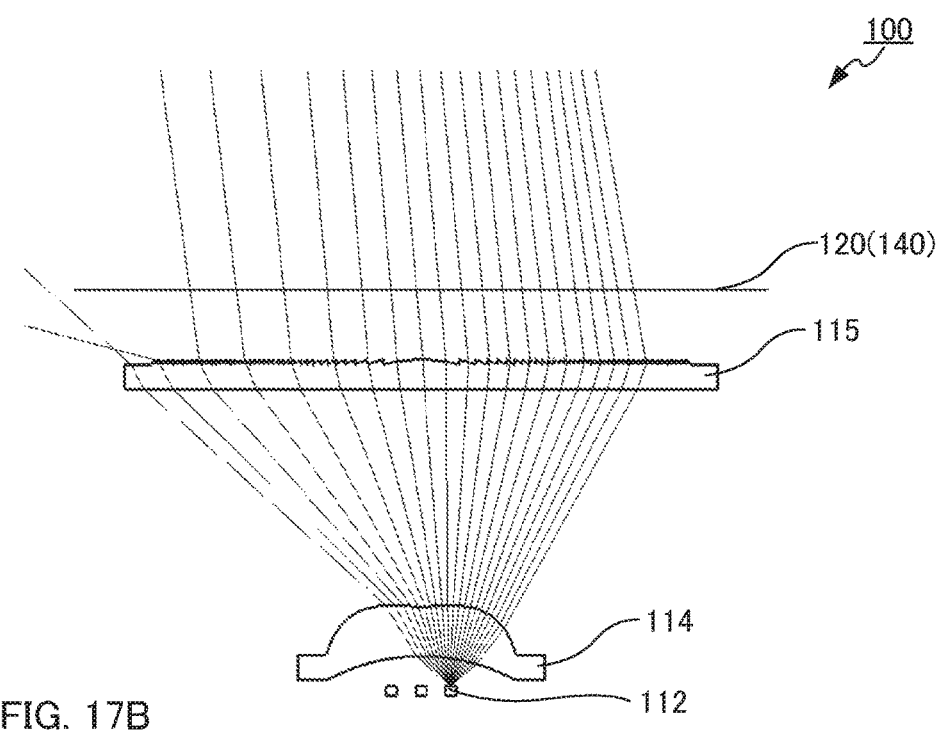
Figure 18A:
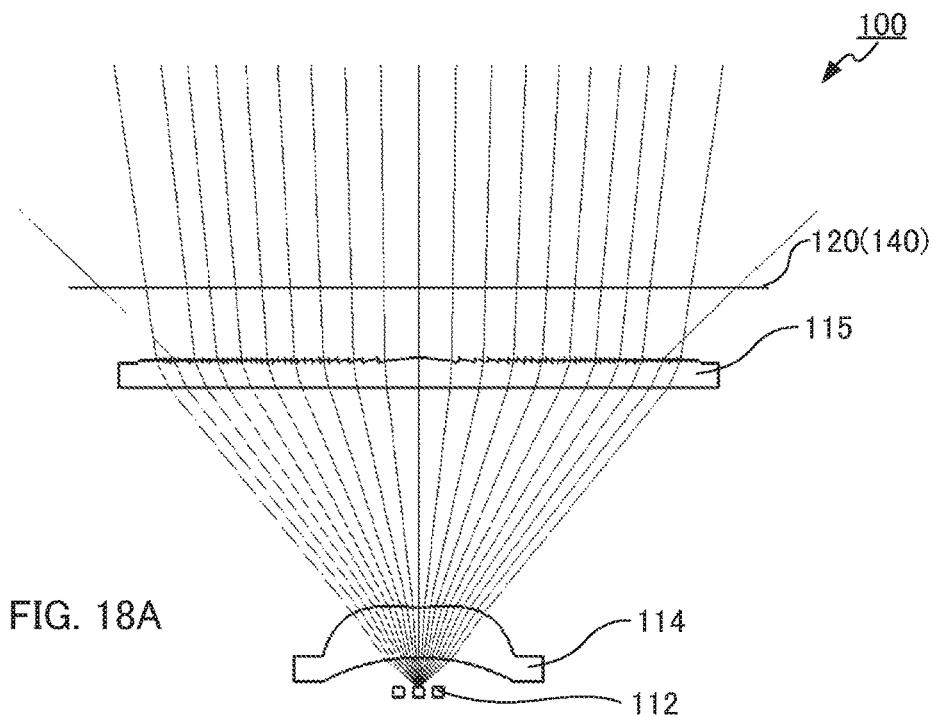
" and FIG. 18A and FIG. 18B illustrate light paths in display device "No. 31."
Figure 18B:
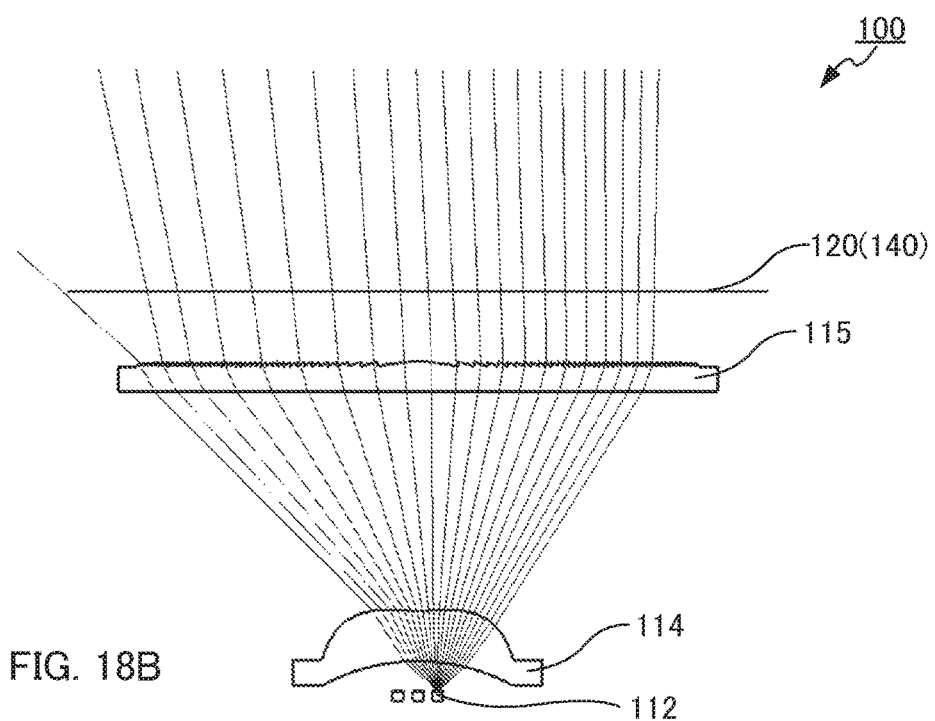

FIG. 16A to FIG. 18B illustrate light paths in representative display devices. FIG. 16A and FIG. 16B illustrate light paths in display device "No. 19." FIG. 16A illustrates light paths of the light emitted from the light emission center of light-emitting element 112 whose optical axis OA coincides with first central axis CA1, and FIG. 16B illustrates light paths of the light emitted from the light emission center of light-emitting element 112 which is the most remote light-emitting element from first central axis CA1. FIG. 17A and FIG. 17B illustrates light paths in display device "No. 23." FIG. 17A illustrates light paths of the light emitted from the light emission center of light-emitting element 112 whose optical axis OA coincides with first central axis CA1, and FIG. 17B illustrates light paths of the light emitted from the light emission center of light-emitting element 112 which is the most remote light-emitting element from first central axis CA1. FIG. 18A and FIG. 18B illustrate light paths in the display device "No. 31." FIG. 18A illustrates light paths of the light emitted from the light emission center of light-emitting element 112 whose optical axis OA coincides with first central axis CA1, and FIG. 18B illustrates light paths of the light emitted from the light emission center of light-emitting element 112 which is the most remote light-emitting element from first central axis CA1. In FIG. 16A to FIG. 18B, hatching of light-emitting element 112, first light flux controlling member 114 and second light flux controlling member 115 is omitted to illustrate light paths.

As shown in Table 3, FIG. 14C, FIG. 18A and FIG. 18B, the uniformity (5°)/uniformity (0°) of the display device "No. 31," whose angle θ4 of fifth light beam L5 to first central axis CA1 is 3° or smaller, was 0.65. One conceivable reason for this is that the light advances in a direction approximately parallel to first central axis CA1, and the quantity of the light emitted in a direction oblique to first central axis CA1 is small in display region 121. In addition, the uniformity (5°)/uniformity (0°) of the display device "No. 32," whose θ4 was 10° or greater, was 0.67. One conceivable reason for this is that the fifth light beam excessively advances to first central axis CA1 side, and consequently the quantity of the light obliquely emitted at a proper angle is small in display region 121.

On the other hand, the uniformity (5°)/uniformity (0°) of the display devices "Nos. 17 to 30," whose θ4 satisfies 3°<θ4<10°, was 0.7 or greater as shown in Table 3, FIG. 14A, FIG. 14B, and FIG. 16A to FIG. 17B. This means that the luminance of the illuminated member was uniformized in its entirety as viewed in a direction perpendicular to the illuminated member (display region), and as viewed in a direction shifted by 5° from the direction perpendicular to the illuminated member (display region).

In this manner, it was confirmed that, when Expressions (1) to (5) are satisfied, the luminance unevenness of the display region is reduced even in the case where the display region is viewed from a direction oblique to the display device, as well as the case where the display region is viewed from the front side while achieving the effect of the display device according to Embodiment 1.

This application is entitled to and claims the benefit of Japanese Patent Application No. 2015-133440 filed on Jul. 2, 2015, and Japanese Patent Application No. 2015-244268 filed on Dec. 15, 2015, the disclosure each of which including the specification, drawings and abstract is incorporated herein by reference in its entirety.

INDUSTRIAL APPLICABILITY

A surface light source device including the light-emitting device according to the embodiments of the present invention is useful as a light source of a head-up display (HUD), for example. In addition, the display device according to the embodiments of the present invention is useful as a head-up display (HUD), for example.

REFERENCE SIGNS LIST

10 Surface light source device
11 Substrate
12 LED
14 Lens array
15 Diffusion member
16 Boundary line
17 Irregular part
100 Display device
110 Surface light source device
111 Substrate
112 Light-emitting element
113 Light flux controlling member
114 First light flux controlling member
115 Second light flux controlling member
120 Display member
121 Display region
130 Light-emitting device
131 First incidence surface
132 First emission surface
132a First inner emission surface
132b First outer emission surface
133 First flange
134 First recess
140 Diffusion plate
141 Second incidence surface
142 Second emission surface
143 Second flange
145 fresnel lens part
146 Protrusion
147 Refracting surface
148 Connection surface

The invention claimed is:

1. A light-emitting device comprising:
a plurality of light-emitting elements; and
a light flux controlling member including a first light flux controlling member and a second light flux controlling member, the light flux controlling member being configured to control a distribution of light emitted from the plurality of light-emitting elements,
wherein the first light flux controlling member includes:
a first incidence surface having a recessed shape disposed to intersect a first central axis of the first light flux controlling member and to face the plurality of light-emitting elements, and
a first emission surface disposed on a side opposite to the first incidence surface, the first emission surface including an inner emission surface disposed to intersect the first central axis, and an outer emission surface disposed to surround the inner emission surface, the outer emission surface having a protruding shape in a cross section including the first central axis,
wherein the second light flux controlling member controls light emitted from the first light flux controlling member to travel in a direction along the first central axis,
wherein one of the plurality of light-emitting elements is disposed in such a manner that an optical axis of the one of the plurality of light-emitting elements coincides with the first central axis and a second central axis of the second light flux controlling member,
wherein an intensity of the light emitted from the plurality of light-emitting elements is highest in the direction along the first central axis,
wherein an Expression (1) is satisfied:

$$-0.6 < d/f < 0 \quad (1)$$

wherein f represents a focus distance of the first light flux controlling member, and d represents a distance between the first central axis and an optical axis of one of the plurality of light-emitting elements which is the most remote light-emitting element from the first central axis among the plurality of light-emitting elements,
wherein Expressions (2) to (5) are satisfied wherein, in a cross section including the first central axis and the second central axis,
$\theta 1$ is an emission angle of a first light beam emitted from a light emission center of the one of the plurality of light-emitting elements,
$\theta 2$ is an angle of a second light beam to the first central axis, the second light beam being a light beam which is generated when the first light beam controlled by the first light flux controlling member is emitted from the first light flux controlling member,
$\theta 3$ is an angle of a third light beam to the first central axis, the third light beam being a light beam which is generated when the second light beam controlling by the second light flux controlling member is emitted from the second light flux controlling member,
$\theta 4$ is an angle of a fifth light beam to the first central axis, the fifth light beam being a light beam which is generated when a fourth light beam emitted in a direction parallel to the first central axis from a light emission center of the light-emitting element which is the most remote light-emitting element from the first central axis is controlled by the first light flux controlling member and the second light flux controlling member, and thereafter emitted from the second light flux controlling member, $$\frac{\Delta(\theta 2_{n+1} - \theta 2_n)}{\Delta(\theta 1_{n+1} - \theta 1_n)} > 0 \quad (2)$$

wherein $0° < \theta 1_n < \theta 1_{n+1} < 60°$, and $\theta 2$ is an angle of a light beam which corresponds to $\theta 1_n$, $$\frac{\Delta(\theta 2_n - \theta 2_{n-1})}{\Delta(\theta 1_n - \theta 1_{n-1})} \geq \frac{\Delta(\theta 2_{n+1} - \theta 2_n)}{\Delta(\theta 1_{n+1} - \theta 1_n)} \quad (3)$$

wherein $0° < \theta 1_{n-1} < \theta 1_n < \theta 1_{n+1} < 60°$, $$-6° < \theta 3 < 10° \quad (4)$$

wherein $0° < θ1 < 40°$, and $θ3$ is an angle of a light beam which corresponds to $θ1$, wherein, with respect to $0°$ set as an angle of light which advances in parallel with the first central axis, $θ3$ has a negative value as the angle to the first central axis when the third light beam approaches the first central axis and has a positive value as the angle to the first central axis when the third light beam travels away from the first central axis, and $$3° < θ4 < 10° \tag{5}$$

wherein, with respect to $0°$ set as an angle of the light which advances in parallel with the first central axis, $θ4$ has a positive value as the angle to the first central axis when the fifth light beam approaches the first central axis and has a negative value as the angle to the first central axis when the fifth light beam travels away from the first central axis.

2. The light-emitting device according to claim 1, wherein the second light flux controlling member includes:
 a second incidence surface disposed to face the first emission surface; and
 a second emission surface disposed on a side opposite to the second incidence surface, the second emission surface including a refractive fresnel lens part that emits incident light in such a manner that the incident light travels in the direction along the first central axis.

3. The light-emitting device according to claim 1, wherein:
 the first incidence surface and the first emission surface are rotationally symmetrical about the first central axis; and
 the second incidence surface and the second emission surface are rotationally symmetrical about the second central axis.

4. A surface light source device comprising:
 the light-emitting device according to claim 1; and
 a diffusion plate disposed with an air layer interposed between the diffusion plate and the light-emitting device.

5. A display device comprising:
 the surface light source device according to claim 4; and
 a display member configured to be illuminated with light emitted from the surface light source device.

\* \* \* \* \*